US011334505B2

(12) United States Patent
Kim

(10) Patent No.: US 11,334,505 B2
(45) Date of Patent: May 17, 2022

(54) SYSTEM AND METHOD FOR OPERATING SYSTEM

(71) Applicant: SK hynix Inc., Gyeonggi-do (KR)

(72) Inventor: Joo Hyung Kim, Gyeonggi-do (KR)

(73) Assignee: SK hynix Inc., Gyeonggi-do (KR)

( * ) Notice: Subject to any disclaimer, the term of this patent is extended or adjusted under 35 U.S.C. 154(b) by 0 days.

(21) Appl. No.: 16/862,649

(22) Filed: Apr. 30, 2020

(65) Prior Publication Data
US 2021/0141750 A1 May 13, 2021

(30) Foreign Application Priority Data

Nov. 12, 2019 (KR) .................. 10-2019-0143900

(51) Int. Cl.
G06F 13/20 (2006.01)
G06F 1/08 (2006.01)

(52) U.S. Cl.
CPC ................ *G06F 13/20* (2013.01); *G06F 1/08* (2013.01)

(58) Field of Classification Search
CPC .................... G06F 13/20; G06F 1/08
See application file for complete search history.

(56) References Cited

U.S. PATENT DOCUMENTS

| 7,352,836 | B1* | 4/2008 | Mendenhall | G06F 5/06 370/304 |
| 7,907,625 | B1* | 3/2011 | MacAdam | H04L 49/101 370/412 |
| 2004/0139362 | A1* | 7/2004 | Inaba | G06F 1/3203 713/322 |
| 2012/0311371 | A1* | 12/2012 | Shaeffer | G06F 13/1694 713/501 |
| 2014/0136737 | A1* | 5/2014 | Dreps | G06F 1/12 710/52 |

FOREIGN PATENT DOCUMENTS

| KR | 10-2000-0064823 | 11/2000 |
| KR | 10-2013-0070251 | 6/2013 |

* cited by examiner

Primary Examiner — Henry Tsai
Assistant Examiner — Harry Z Wang
(74) Attorney, Agent, or Firm — IP & T Group LLP

(57) ABSTRACT

Embodiments of the present disclosure relate to a system and a method for operating the system. The operating mode of a data processing circuit is changed according to a request indicating whether or not a first clock or a second clock is to be changed. Data transmitted from a first module to a second module inside the system is processed according to the operating mode of the data processing system. Accordingly, when the clock of one of modules included in the system changes, the module can quickly switch to a state in which the same can transmit/receive data to/from another module included in the system, and the performance of data transmission/reception between the modules included in the system can be optimized.

15 Claims, 18 Drawing Sheets

SYSTEM AND METHOD FOR OPERATING SYSTEM

CROSS REFERENCE TO RELATED APPLICATION

This application claims priority from Korean Patent Application No. 10-2019-0143900, filed on Nov. 12, 2019, which is hereby incorporated by reference for all purposes as if fully set forth herein.

BACKGROUND OF THE INVENTION

1. Field of the Invention

Embodiments of the present disclosure relate to a system and a method for operating a system.

2. Description of the Prior Art

Various systems have been developed to implement functions of electronic devices such as computers, smartphones, and tablets. Such systems include, for example, a memory system, such as a hard disk drive (HDD) and a solid state drive (SSD), configured to store data. Another exemplary system is a communication system configured to communicate with an external device on the basis of various wired/wireless protocols (for example, Bluetooth, Ethernet, and Wi-Fi).

Such a system may include multiple modules therein, and respective modules may exchange data with each other. Clocks used for operations of respective modules may be identical or different, and may change over time.

SUMMARY OF THE INVENTION

Embodiments of the present disclosure may provide a system and a method for operating the system, wherein, when the clock of one of modules included in the system changes, the corresponding module can quickly switch to a state in which the module can transmit/receive data to/from another module included in the system.

In addition, embodiments of the present disclosure may provide a system and a method for operating the system, wherein the performance regarding data transmission/reception between modules included in the system can be optimized.

In an aspect, embodiments of the present disclosure may provide a system including a first module, a second module, a bus, a data processing circuit, and a controller.

The first module may operate according to a first clock, and the second module may operate according to a second clock.

The bus may be connected to the first module and to the second module.

The data processing circuit may process source data transmitted from the first module and to provide the processed source data to the second module, on the basis of an operating mode of the data processing circuit. Specifically, the data processing circuit may change the source data to correspond to the second clock from the first clock when the operating mode is the first mode, and may provide the second module with the source data without change when the operating mode is the second mode.

The data processing circuit may include a multiplexer configured to output one of i) a first signal indicating the source data without change and ii) a second signal indicating result data obtained by changing the source data to correspond to the second clock from the first clock.

The data processing circuit may include a bridge circuit configured to generate the result data.

The controller may control the data processing circuit to change the operating mode to the first mode or to the second mode according to a request.

The request may indicate that at least one of the first clock and the second clock is to be changed.

The controller may change the operating mode of the data processing circuit to the first mode or to the second mode when the bus is idle after the request is received.

When the request indicates that values of the first clock and the second clock are to be changed identically, the controller may change the operating mode of the data processing circuit to the second mode. The controller may change the operating mode of the data processing circuit to the second mode after the first clock and the second clock are changed to be identical.

On the other hand, when the request indicates that values of the first clock and the second clock are to be changed differently, the controller may change the operating mode of the data processing circuit to the first mode. The controller may change the operating mode of the data processing circuit to the first mode before the first clock and the second clock are changed to be different.

The controller may change the operating mode of the data processing circuit to the first mode or to the second mode when an acknowledgement signal regarding the request is transmitted.

In another aspect, embodiments of the present disclosure may provide a method for operating a system including first and second modules respectively operating according to first and second clocks.

The method for operating a system may include a step of receiving a request indicating whether or not the first clock or the second clock is to be changed.

The method for operating a system may include a step of changing an operating mode of a data processing circuit to a first mode or to a second mode according to the request.

The method for operating a system may include processing source data transmitted from the first module to provide to a second module one the basis of an operating mode. Specifically, the processing of the source data may include changing the source data to correspond to the second clock from the first clock when the operating mode is the first mode; and providing a second module with the source data without change when the operating mode is the second mode.

The step of changing the operating mode may include a step of confirming whether or not a bus connected to the first module and to the second module is idle.

The step of changing the operating mode may include a step of changing the operating mode to the first mode or to the second mode when the bus is idle.

The processing of the source data may output one i) a first signal indicating the source data without change and ii) a second signal indicating result data obtained by changing the source data to correspond to the second clock from the first clock.

The step of changing the operating mode may include changing the operation method to the second mode when the request indicates that at least one of the first clock and the second clock is to be changed such that the first and second clocks are identical. The operating mode of the data processing circuit may be changed to the second mode after the first clock and the second clock are changed to be identical.

The step of changing the operating mode may include changing the operation method to the first mode when the request indicates that the first clock and the second clock are to be changed to be different. The operating mode of the data processing circuit may be changed to the first mode before at least one of the first clock and the second clock is changed such that first and second clocks are different.

In another aspect, embodiments of the present disclosure may provide a system including: first and second modules configured to operate according to first and second clocks respectively; and signal processing circuitry.

The signal processing circuitry may receive a signal from the first module through a bus. The signal processing circuitry may change, while the bus is in an idle state, itself to process the received signal to correspond to one of the first and second clocks. The signal processing may provide the processed signal to the second module through the bus.

In another aspect, embodiments of the present disclosure may provide a system including: a module configured to operate according to a clock of a first frequency; and signal processing circuitry.

The signal processing circuitry may change, while a bus is in an idle state, itself to process a signal to correspond to one of the clock of the first frequency and another clock of second frequency. The signal processing circuitry may provide the processed signal to the module through the bus.

According to embodiments of the present disclosure, when the clock of one of modules included in a system changes, the corresponding module can quickly switch to a state in which the module can transmit/receive data to/from another module included in the system.

In addition, according to embodiments of the present disclosure, the performance regarding data transmission/reception between modules included in the system can be optimized.

BRIEF DESCRIPTION OF THE DRAWINGS

The above and other aspects, features and advantages of the present disclosure will be more apparent from the following detailed description taken in conjunction with the accompanying drawings, in which.

DETAILED DESCRIPTION OF EMBODIMENTS

Hereinafter, embodiments of the present disclosure are described in detail with reference to the accompanying drawings. Throughout the specification, reference to "an embodiment," "another embodiment" or the like is not necessarily to only one embodiment, and different references to any such phrase are not necessarily to the same embodiment(s).

Figure 1:
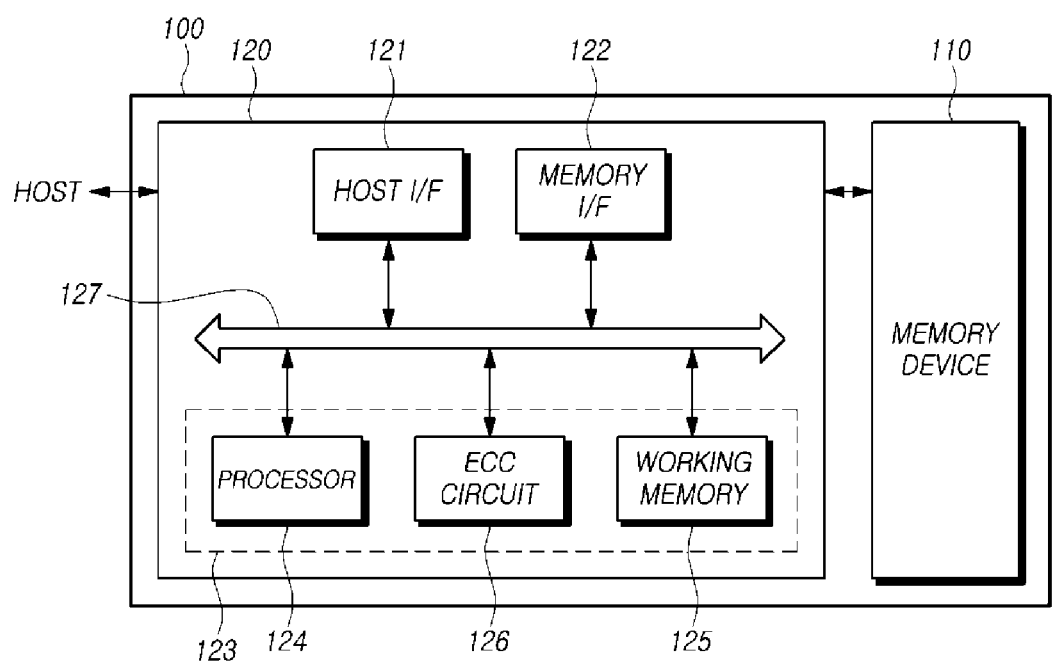
FIG. 1 is a diagram schematically illustrating a configuration of a memory system according to an embodiment of the present disclosure.

FIG. 1 is a diagram schematically illustrating a configuration of a memory system 100 according to an embodiment of the present disclosure.

Referring to FIG. 1, the memory system 100 may include a memory device 110 configured to store data, a memory controller 120 configured to control the memory device 110, and the like.

The memory device 110 includes multiple memory blocks and operates in response to control of the memory device 120. Operations of the memory device 110 may include, for example, a read operation, a program operation (also referred to as "write operation"), an erasure operation, and the like.

The memory device 110 may include a memory cell array including multiple memory cells (also simply referred to as "cell") configured to store data. The memory cell array may exist in a memory block.

The memory device 110 may be implemented as any of various types, such as a double data rate synchronous dynamic random access memory (DDR SDRAM), a low power double data rate4 (LPDDR4) SDRAM, a graphics double data rate (GDDR) SDRAM, a low power DDR (LPDDR), a Rambus dynamic random access memory (RDRAM), a NAND flash memory, a 3D NAND flash memory, a NOR flash memory, a resistive random access memory (RRAM), a phase-change memory (PRAM), a magnetoresistive random access memory (MRAM), a ferroelectric random access memory (FRAM), or a spin transfer torque random access memory (STT-RAM).

The memory device 110 may be implemented in a three-dimensional array structure. Embodiments of the present disclosure are applicable not only to a flash memory device having a charge storage layer configured by a conductive floating gate, but also to a charge trap flash (CTF) having a charge storage layer configured by an insulating film.

The memory device 110 is configured to receive a command, an address, and the like from the memory controller 120 and to access an area selected by the address inside the memory cell array. That is, the memory device 110 may perform an operation corresponding to the command with regard to the area selected by the address.

For example, the memory device 110 may perform a program operation, a read operation, an erasure operation, and the like. During a program operation, the memory device 110 may program data in an area selected by an address. During a read operation, the memory device 110 may read data from an area selected by an address. During an erasure operation, the memory device 110 may erase data stored in an area selected by an address.

The memory controller 120 may control a write (program) operation, a read operation, an erasure operation, and a background operation regarding the memory device 110. The background operation may include, for example, a garbage collection (GC) operation, a wear leveling (WL) operation, and/or a bad block management (BBM) operation.

The memory controller 120 may control operations of the memory device 110 at the request of a host (HOST). Alternatively, the memory controller 120 may control operations of the memory device 110 even in the absence of a request of the host.

The memory controller 120 and the host may be separate devices. If necessary, however, the memory controller 120 and the host may be integrated into and implemented as a single device. It is assumed in the following description, by way of example, that the memory controller 120 and the host are separate devices.

Referring to FIG. 1, the memory controller 120 may include a memory interface 122, a control circuit 123, a host interface 121, and the like.

The host interface 121 is configured to provide an interface for communicating with the host.

When receiving a command from the host, the control circuit 123 may perform operations of receiving the command through the host interface 121 and processing the received command.

The memory interface 122 is connected to the memory device 110 and is configured to provide an interface for communicating with the memory device 110. That is, the memory interface 122 may be configured to provide an interface between the memory device 110 and the memory controller 120 in response to control of the control circuit 123.

The control circuit 123 is configured to control overall operations of the memory controller 120, thereby controlling operations of the memory device 110. To this end, the control circuit 123 may include, for example, a processor 124 and/or a working memory 124, and may further include an error detection-and-correction circuit (ECC circuit) 126, if necessary.

The processor 124 may control overall operations of the memory controller 120 and may perform logical operations. The processor 124 may communicate with the host through the host interface 121 and may communicate with the memory device 110 through the memory interface 122.

The processor 124 may perform the function of a flash translation layer (FTL). The processor 124 may convert a logical block address (LBA) provided by the host to a physical block address (PBA) through the FTL. The FTL may receive the LBA and convert the same to the PBA by using a mapping table.

The FTL may map addresses according to any of various methods, depending on the mapping unit. Typical address mapping methods include a page mapping method, a block mapping method, and a hybrid mapping method.

The processor 124 is configured to randomize data received from the host. For example, the processor 124 may randomize data received from the host by using a randomizing seed. The randomized data is provided to the memory device 110 as data to be stored, and is programmed in the memory cell array.

The processor 124 is configured to derandomize data received from the memory device 110 during a read operation. For example, the processor 124 may derandomize data received from the memory device 110 by using a derandomizing seed. The derandomized data may be output to the host.

The processor 124 may execute firmware so as to control operations of the memory controller 120. In other words, the processor 124 may control overall operations of the memory controller 120 and may execute (drive) firmware loaded into the working memory 125 during booting, in order to perform a logical operation.

The firmware may be a program executed inside the memory system 100, and may include various functional layers.

For example, the firmware may include a flash translation layer (FTL) configured to translate between a logical address that the host requests the memory system 100 to provide and a physical address of the memory device 110, a host interface layer (HIL) configured to interpret a command that the host requests the memory system 100 (storage device) to follow and to deliver the same to the FTL, and/or a flash interface layer (FIL) configured to deliver a command issued by the FTL to the memory device 110.

The firmware may be stored in the memory device 110, for example, and then loaded into the working memory 125.

The working memory 125 may store firmware, program codes, commands, or data necessary to drive the memory controller 120. The working memory 125 may include, as a volatile memory, a static RAM (SRAM), a dynamic RAM (DRAM), and/or a synchronous DRAM (SDRAM), for example.

The error detection-and-correction circuit 126 may be configured to detect an error bit in target data by using an error correction code and to correct the detected error bit. The target data may be, for example, data stored in the working memory 125 or data retrieved from the memory device 110.

The error detection-and-correction circuit 126 may be implemented to decode data by using the error correction code. The error detection-and-correction circuit 126 may be implemented by one or more of various code decoders. For example, a decoder configured to perform unsystematic code decoding or a decoder configured to perform systematic code decoding may be used.

For example, the error detection-and-correction circuit 126 may detect error bits, sector by sector, with regard to respective pieces of read data. That is, each piece of read data may include multiple sectors. A sector may refer to a data unit smaller than a page, which is the read unit of a flash memory. Sectors constituting each piece of read data may correspond to each other via addresses.

The error detection-and-correction circuit 126 may calculate a bit error rate (BER) and determine whether or not each sector is correctable. For example, if the BER is higher than a reference value, the error detection-and-correction circuit 126 may determine that the corresponding sector is uncorrectable (or has failed). On the other hand, if the BER is lower than the reference value, the error detection-and-correction circuit 126 may determine that the corresponding sector is correctable (or has passed).

The error detection-and-correction circuit 126 may successively perform error detection and correction operations with regard to all pieces of read data. If a sector included in read data is correctable, the error detection-and-correction circuit 126 may omit the error detection and correction operations regarding the corresponding sector of the next piece of read data. After the error detection correction operations are finished with regard to all pieces of read data in this manner, the error detection-and-correction circuit 126 may determine that there are one or more uncorrectable sectors. The error detection-and-correction circuit 126 may deliver information (for example, address information) regarding the sector(s) deemed uncorrectable to the processor 124.

The bus 127 may be configured to provide a channel between the components 121, 122, 124, 125, and 126 of the memory controller 120. The bus 127 may include, for example, a control bus for delivering various kinds of control signals and commands and a data bus for delivering various kinds of data.

The memory controller 120 and the above-mentioned components 121, 122, 124, 125, and 126 are only examples. Some of the above-mentioned components 121, 122, 124, 125, and 126 of the memory controller 120 may be omitted, or some of the above-mentioned components 121, 122, 124, 125, and 126 of the memory controller 120 may be integrated into one. If necessary, one or more additional components may be added to the memory controller 120.

Hereinafter, the memory device 110 is described in more detail with reference to FIG. 2.

Figure 2:
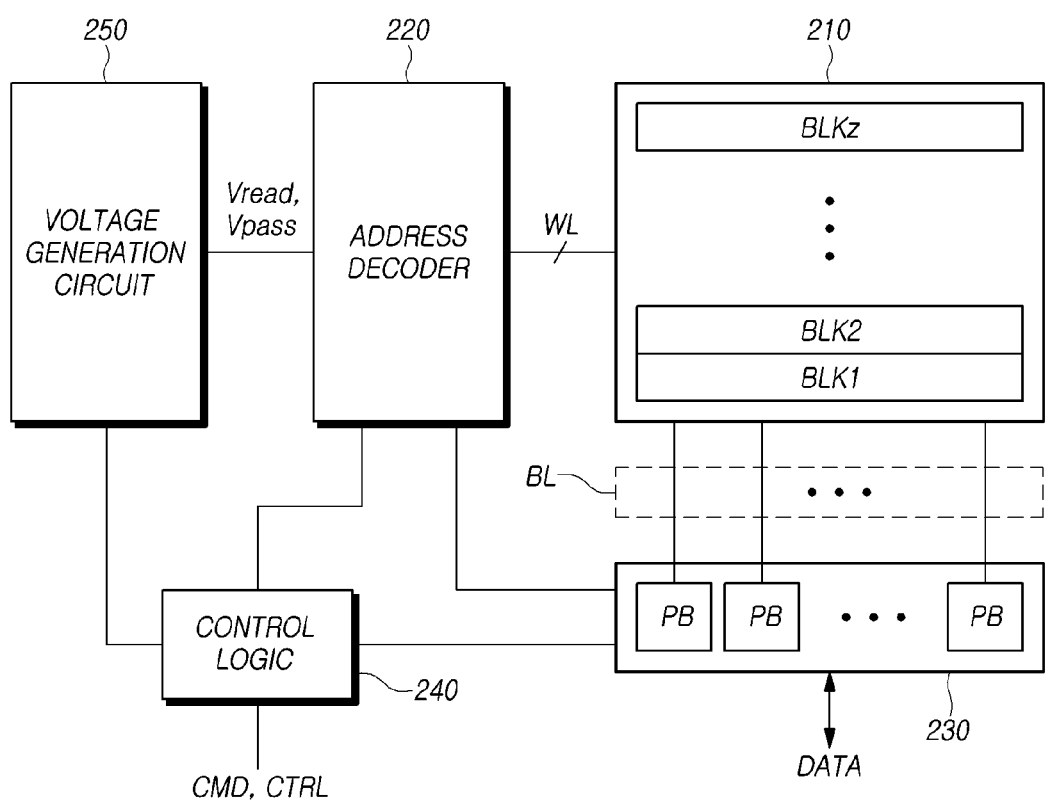
FIG. 2 is a block diagram schematically illustrating a memory device according to an embodiment of the present disclosure.

FIG. 2 is a block diagram schematically illustrating a memory device 110 according to an embodiment of the present disclosure.

Referring to FIG. 2, the memory device 110 may include a memory cell array 210, an address decoder 220, a read-and-write circuit 230, control logic 240, a voltage generation circuit 250, and the like.

The memory cell array 210 may include multiple memory blocks BLK1-BLKz (z is a natural number equal to or larger than 2).

In the multiple memory blocks BLK1-BLKz, multiple word lines WL and multiple bit lines BL may be disposed, and multiple memory cells MC may be arranged therein.

The multiple memory blocks BLK1-BLKz may be connected to the address decoder 220 through the multiple word lines WL. The multiple memory blocks BLK1-BLKz may be connected to the read-and-write circuit 230 through the multiple bit lines BL.

Each of the multiple memory blocks BLK1-BLKz may include multiple memory cells. For example, the multiple memory cells may be nonvolatile memory cells, and may include nonvolatile memory cells having a vertical channel structure.

The memory cell array 210 may be configured as a memory cell array having a two-dimensional structure, and may be configured as a memory cell array having a three-dimensional structure, if necessary.

Each of the multiple memory cells included in the memory cell array 210 may store at least one bit of data. For example, each of the multiple memory cells included in the memory cell array 210 may be a single-level cell (SLC) configured to store one bit of data, a multi-level cell (MLC) configured to store two bits of data, a triple-level cell (TLC) configured to store three bits of data, or a quad-level cell (QLC) configured to store four bits of data. As another example, the memory cell array 210 may include multiple memory cells each configured to store at least five bits of data.

Referring to FIG. 2, the address decoder 220, the read-and-write circuit 230, the control logic 240, the voltage generation circuit 250, and the like may operate together as a peripheral circuit configured to drive the memory cell array 210.

The address decoder 220 may be connected to the memory cell array 210 through multiple word lines WL.

The address decoder 220 may be configured to operate in response to control of the control logic 240.

The address decoder 220 may receive addresses through an input/output buffer inside the memory device 110. The address decoder 220 may be configured to decode a block address among the received addresses. The address decoder 220 may select at least one memory block according to the decoded block address.

The address decoder 220 may receive a read voltage Vread and a pass voltage Vpass from the voltage generation circuit 250.

In the case of a read voltage applying operation during a read operation, the address decoder 220 may apply a read voltage Vread to a selected word line WL inside a selected memory block, and may apply a pass voltage Vpass to the remaining unselected word lines WL.

During a program verification operation, the address decoder 220 may apply a verification voltage generated by the voltage generation circuit 250 to the selected word line WL inside the selected memory block, and may apply a pass voltage Vpass to the remaining unselected word lines WL.

The address decoder 220 may be configured to decode a column address among received addresses. The address decoder 220 may transmit the decoded column address to the read-and-write circuit 230.

The read operation and program operation of the memory device 110 may be performed page by page. Addresses received when the read operation and program operation are requested may include a block address, a row address, and/or a column address.

The address decoder 220 may select one memory block and one word line according to the block address and the row address. The column address may be decoded by the address decoder 220 and provided to the read-and-write circuit 230.

The address decoder 220 may include a block decoder, a row decoder, a column decoder, and/or an address buffer.

The read-and-write circuit 230 may include multiple page buffers PB. The read-and-write circuit 230 may operate as a "read circuit" during a read operation of the memory cell array 210 and may operate as a "write circuit" during a write operation thereof.

The above-mentioned read-and-write circuit 230 is also referred to as a page buffer circuit including multiple page buffers PB, or a data register circuit. The read-and-write circuit 230 may include a data buffer used in a data processing function, and may further include a cache buffer used in a caching function, if necessary.

The multiple page buffers PB may be connected to the memory cell array 210 through multiple bit lines BL. During a read operation and a program verification operation, the multiple page buffers PB may continuously supply a sensing current to bit lines BL connected to memory cells, in order to sense the threshold voltage Vth of the memory cells, may sense a change in the amount of flowing current according to the program state of a corresponding memory cell through a sensing node, and may latch the same as sensing data.

The read-and-write circuit 230 may operate in response to page buffer control signals output from the control logic 240.

During a read operation, the read-and-write circuit 230 senses data in a memory cell, temporarily stores the retrieved data, and outputs the data DATA to the input/output buffer of the memory device 110. As an exemplary embodiment, the read-and-write circuit 230 may include a column selection circuit and the like in addition to the page buffers PB or page resisters.

The control logic 240 may be connected to the address decoder 220, the read-and-write circuit 230, the voltage generation circuit 250, and the like. The control logic 240 may receive a command CMD and a control signal CTRL through the input/output buffer of the memory device 110.

The control logic 240 may be configured to control overall operations of the memory device 110 in response to the control signal CTRL. The control logic 240 may output a control signal for adjusting the pre-charge potential level of sensing nodes of multiple page buffers PB.

The control logic 240 may control the read-and-write circuit 230 so as to perform a read operation of the memory cell array 210. In response to a voltage generation circuit control signal output from the control logic 240, the voltage generation circuit 250 may generate a read voltage Vread and a pass voltage Vpass, which are used during a read operation.

Figure 3:
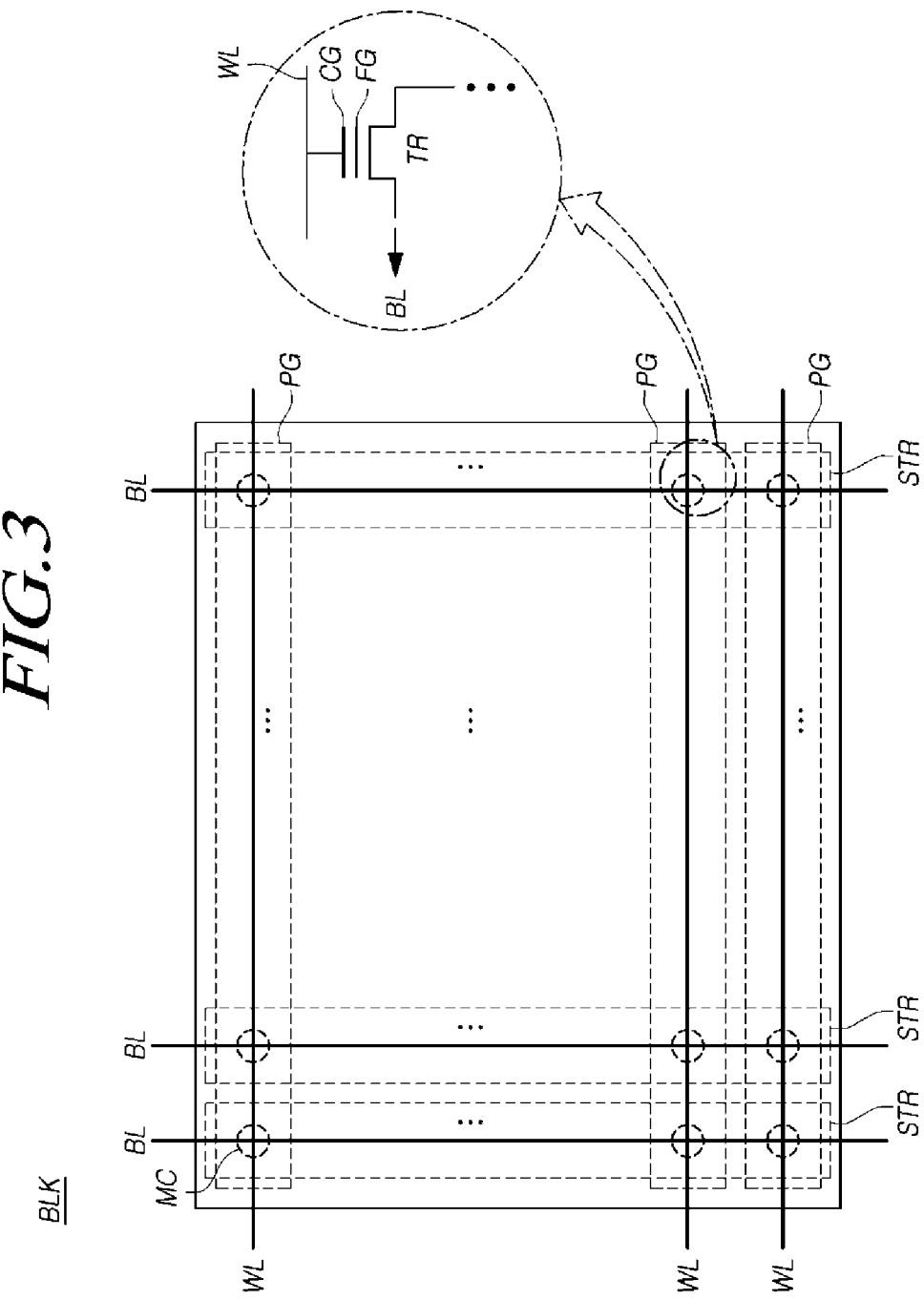
FIG. 3 is a diagram schematically illustrating respective memory blocks of a memory device according to an embodiment of the present disclosure.

FIG. 3 is a diagram schematically illustrating respective memory blocks BLK of a memory device 110 according to an embodiment of the present disclosure.

Referring to FIG. 3, a memory block BLK included in a memory device 110 may include, for example, multiple pages PG and multiple strings STR disposed in intersecting directions.

The multiple pages PG correspond to multiple word lines WL, and the multiple string STR correspond to multiple bit lines BL.

The memory block BLK may have multiple word lines WL and multiple bit lines BL disposed so as to intersect with each other. For example, each of the multiple word lines WL may be disposed in a row direction, and each of the multiple bit lines BL may be disposed in a column direction. As another example, each of the multiple word lines WL may be disposed in the column direction, and each of the multiple bit lines BL may be disposed in the row direction.

Multiple word lines WL and multiple bit lines BL may insect with each other, thereby defining multiple memory cells MC. Each memory cell MC may have a transistor TR disposed therein.

For example, the transistor TR disposed in each memory cell MC may include a drain, a source, a gate, and the like. The drain (or source) of the transistor TR may be directly connected to a corresponding bit line BL or connected thereto via another transistor TR. The source (or drain) of the transistor TR may be directly connected to a source line (which may be ground) or connected thereto via another transistor TR. The gate of the transistor TR may include a floating gate (FG) surrounded by an insulator and a control gate (CG) to which a gate voltage is applied from a word line WL.

Each of the multiple memory blocks BLK1-BLKz may have a first selection line (also referred to as a source selection line or a drain selection line) additionally disposed outside a first outermost word line, which is closer to the read-and-write circuit 230, and may have a second selection line (also referred to as a drain selection line or a source selection line) additionally disposed outside a second outermost word line.

If necessary, at least one dummy word line may be additionally disposed between the first outermost word line and the first selection line. In addition, at least one dummy word line may be additionally disposed between the second outermost word line and the second selection line.

When having a memory block structure as illustrated in FIG. 3, a read operation and a program operation (write operation) may be performed page by page, and an erasure operation may be performed for each memory block.

Figure 4:
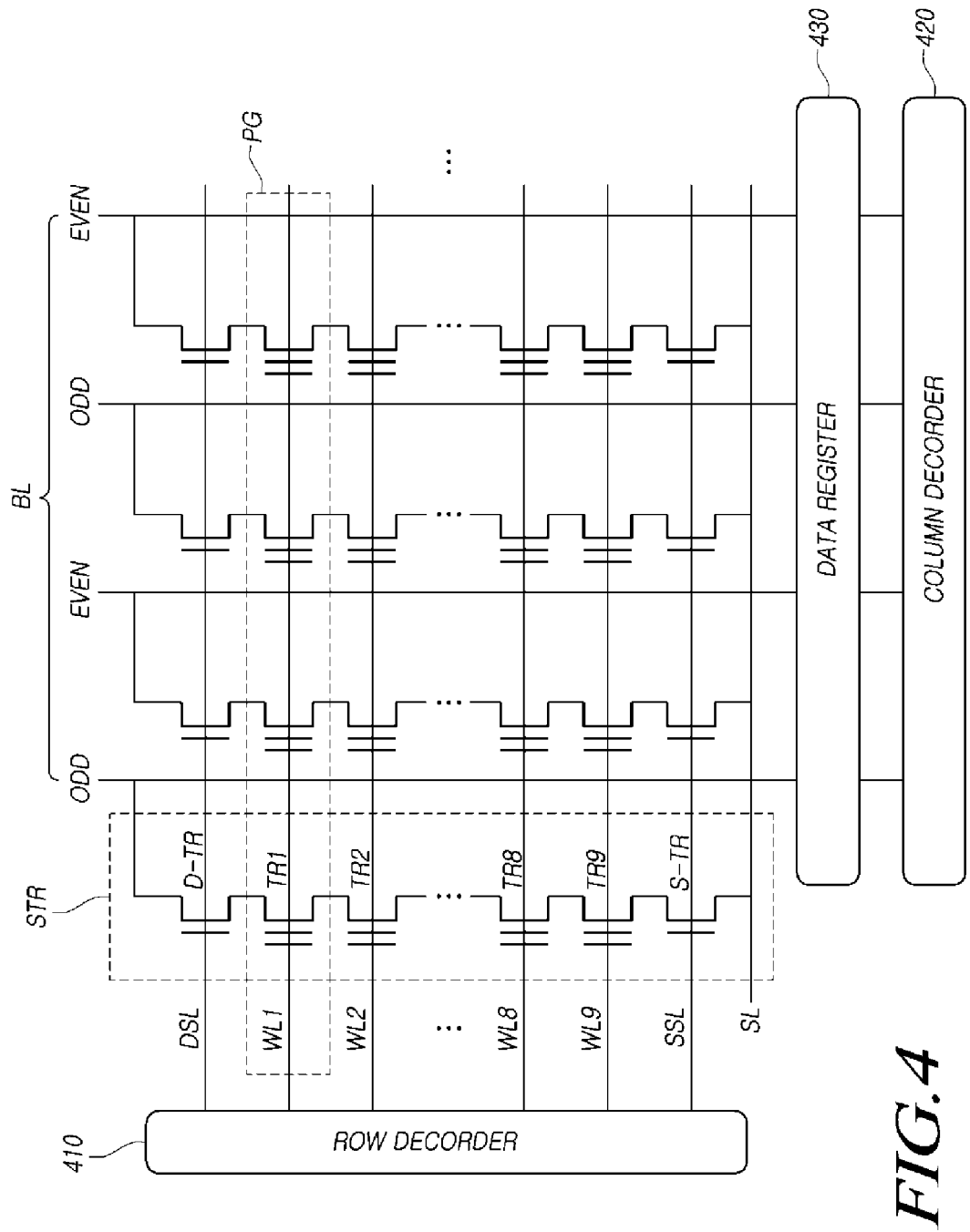
FIG. 4 is a diagram illustrating the structure of word lines and bit lines of a memory device according to an embodiment of the present disclosure.

FIG. 4 is a diagram illustrating the structure of word lines WL and bit lines BL of a memory device 110 according to an embodiment of the present disclosure.

Referring to FIG. 4, the memory device 110 includes a core area in which memory cells MC are concentrated and an auxiliary area distinct from the core area, and which supports operations of the memory cell array 210.

The core area may include pages PG and string STR. The core area has multiple word lines WL1-WL9 and multiple bit lines BL disposed to intersect with each other.

The multiple word lines WL1-WL9 may be connected to a row decoder 410, and the multiple bit lines BL may be connected to a column decoder 420. A data register 430, which corresponds to a read-and-write circuit 230, may exist between the multiple bit lines BL and the column decoder 420.

The multiple word lines WL1-WL9 correspond to multiple pages PG.

For example, as illustrated in FIG. 4, each of the multiple word lines WL1-WL9 may correspond to one page PG. Alternatively, when each of the multiple word lines WL1-WL9 is large, each of the multiple word lines WL1-WL9 may correspond to multiple (for example, two or four) pages PG. A page PG serves as the smallest unit in connection with conducting a program operation and a read operation, and all memory cells MC in the same page PG may perform simultaneous operations during a program operation and a read operation.

Among the multiple bit lines BL, odd-numbers bit lines BL and even-numbered bit lines BL may be distinguished and accordingly connected to the column decoder 420.

In order to access a memory cell MC, the address goes through the input/output end and then enters the core area through the row decoder 410 and the column decoder 420, and the target memory cell then can be designated. As used herein, designating a target memory cell refers to accessing one of memory cells MC at an intersection between word lines WL1-WL9 connected to the row decoder 410 and bit lines BL connected to the column decoder 420, in order to program data in that memory cell or to read programmed data therefrom.

Pages PG in a first direction (for example, X-axis direction) are grouped by a commonly used line referred to as a word line WL, and strings STR in a second direction (for example, Y-axis direction) are grouped (connected) by a common line referred to as a bit line BL. As used herein, being commonly grouped means that they are structurally connected by the same material, and the same voltage is simultaneously applied thereto during voltage application. Obviously, the voltage applied to one memory cell MC among memory cells MC connected in series may slightly differ from the voltage applied to another memory cell MC in the series, due to the voltage drop that occurs during the voltage application process.

All data processed by the memory device 110 is programmed and read via the data register 430. If data processing by the data register 430 slows down, all other areas need to wait until the data register 430 finishes the data processing. In addition, performance degradation of the data register 430 may be followed by overall performance degradation of the memory device 110.

Referring to the example in FIG. 4, multiple transistors TR1-TR9 may exist in one string STR while being connected to multiple word lines WL1-WL9. The areas in which the multiple transistors TR1-TR9 exist correspond to memory cells MC. The multiple transistors TR1-TR9 include control gates CG and floating gates FG, as described above.

The multiple word lines WL1-WL9 include two outermost word lines WL1 and WL9. A first selection line DSL may be additionally disposed outside the first outermost word line WL1, which is closer to the data register 430 in terms of the signal path, and a second selection line SSL may be additionally disposed outside the second outermost word line WL9.

The first selection transistor D-TR, which is controlled to turn on/off by the first selection line DSL, has a gate electrode connected to the first selection line DSL but includes no floating gate FG. The second selection transistor S-TR, which is controlled to turn on/off by the second selection line SSL, has a gate electrode connected to the second selection line SSL but includes no floating gate FG.

The first selection transistor D-TR plays the role of a switch that turns on or off the connection between the corresponding string STR and the data register 430. The second selection transistor S-TR plays the role of a switch that turns on or off the connection between the corresponding string STR and the source line SL. That is, the first selection transistor D-TR and the second selection transistor S-TR are positioned on both ends of the corresponding string STR and play the role of gatekeepers that connect and disconnect signals.

During a program operation, the memory system 100 fills the target memory cell MC of the bit line BL, which is to be programmed, with electrons. Accordingly, the memory system 100 applies a turn-on voltage Vcc to the gate electrode of the first selection transistor D-TR, thereby turning on the first selection transistor D-TR, and applies a turn-off voltage (for example, 0V) to the gate electrode of the second selection transistor S-TR, thereby turning off the second selection transistor S-TR.

During a read operation or a verification operation, the memory system 100 turns on both the first selection transistor D-TR and the second selection transistor S-TR. Accordingly, a current may flow through the corresponding string STR and drain to a source line SL corresponding to the ground, thereby making it possible to measure the voltage level of the bit line BL. However, during a read operation, there may be a time difference in the on-off timing between the first selection transistor D-TR and the second selection transistor S-TR.

During an erasure operation, the memory system 100 may supply a voltage (for example, +20V) to the substrate through the source line SL. During the erasure operation, the memory system 100 floats both the first selection transistor D-TR and the second selection transistor S-TR, thereby generating an infinite resistance. The resulting structure removes the roles of the first selection transistor D-TR and the second selection transistor S-TR, and enables electrons to operate by means of the potential difference only between the floating gate FG and the substrate.

Figure 5:
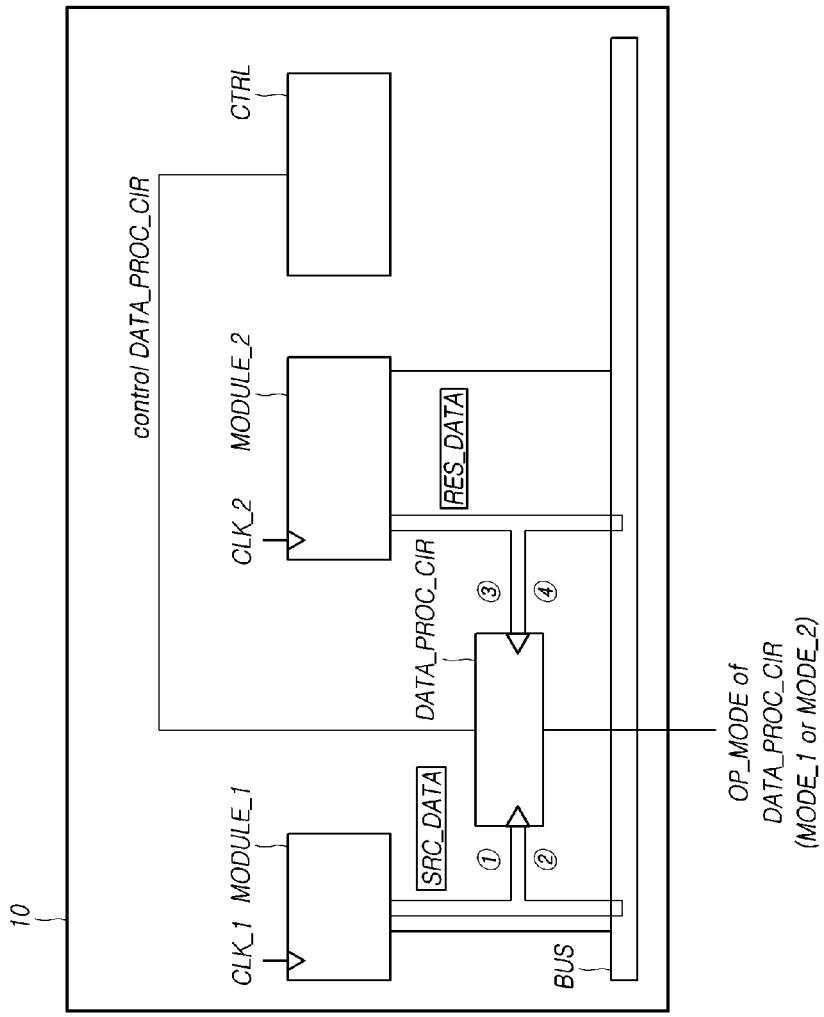
FIG. 5 is a diagram schematically illustrating a configuration of a system according to an embodiment of the present disclosure.

FIG. 5 is a diagram illustrating a schematic configuration of a system 10 according to an embodiment of the present disclosure.

The system 10 may include a first module MODULE_1 and a second module MODULE_2. The first module MODULE_1 may operate with a first clock CLK_1, and the second module MODULE_2 may operate with a second clock CLK_2. Each of the first module MODULE_1 and the second MODULE_2 may be one of multiple modules (for example, processors/memories) included in the system 10.

The first clock CLK_1 and the second clock CLK_2 may be identical or different. As used herein, identical clocks operate at the same frequency, i.e., the clocks each operate at 300 MHz or at 600 MHz, whereas different clocks operate at different frequencies, for example one operates at 300 MHz and another operates at 600 MHz.

The first clock CLK_1 and the second clock CLK_2 may be generated by a clock generation circuit disposed within or external to the system 10.

The first clock CLK_1 and the second clock CLK_2 may operate on the basis of a preconfigured reference clock value. For example, the operating frequencies of the first clock CLK_1 and the second clock CLK_2 may correspond to $1/(2^n)$ of the reference clock value (wherein n is an integer). For example, if the reference clock value is 600 MHz, the first clock CLK_1 may be $600/(2^1)=300$ MHz, and the second clock CLK_2 may be $600/(2^2)=150$ MHz.

The system 10 may include a bus (BUS) connected to the first module MODULE_1 and the second module MODULE_2. The bus may be directly wired and connected to the first module MODULE_1 and the second module MODULE_2, or may be connected to the first module MODULE_1 and the second module MODULE_2 via another module.

The bus may provide a channel for data transmission/reception between the first module MODULE_1 and the second module MODULE_2. The bus may have a clock different from the first clock CLK_1 and the second clock CLK_2.

The bus may be implemented on the basis of various technologies. For example, the bus may be implemented as an advanced high-performance bus (AHB) based on an advanced microcontroller bus architecture (AMBA) protocol, an advanced system bus (ASB), or an advanced peripheral bus (APB).

The system 10 may include a data processing circuit DATA_PROC_CIR configured to process source data SRC_DATA, which is provided from the first module MODULE_1 and to be transmitted to the second module MODULE_2, on the basis of an operating mode OP_MODE. The operating mode OP_MODE may be a first mode MODE_1 or a second mode MODE_2.

The data processing circuit DATA_PROC_CIR may receive source data SRC_DATA directly from the first module MODULE_1 (①) or may receive source data SRC_DATA from the first module MODULE_1 via the bus BUS (②).

The data processing circuit DATA_PROC_CIR may transmit one between the source data SRC_DATA without change and the result data RES_DATA, which is the result of processing the source data SRC_DATA, to the second module MODULE_2. The data processing circuit DATA_PROC_CIR may transmit the result data RES_DATA directly to the second module MODULE_2 (③) or may transmit the result data RES_DATA to the second module MODULE_2 via the bus (④).

A detailed operating method of the data processing circuit DATA_PROC_CIR is described later with reference to FIG. 6.

The system 10 may include a controller CTRL configured to control the data processing circuit DATA_PROC_CIR so as to change the operating mode OP_MODE of the data processing circuit DATA_PROC_CIR to the first mode MODE_1 or to the second mode MODE_2 according to a request, which is described with reference to FIG. 11.

The system 10 may be the memory system 100 described with reference to FIG. 1 to FIG. 4. The first module MODULE_1 of the system 10 may be the processor 124 of the memory system 100, for example, and the second module MODULE_2 may be the working memory 125 of the memory system 100, for example. The bus of the system 10 may be the bus 127 of the memory system 100.

Hereinafter, detailed operations of components included in the system 10 are described.

Figure 6:
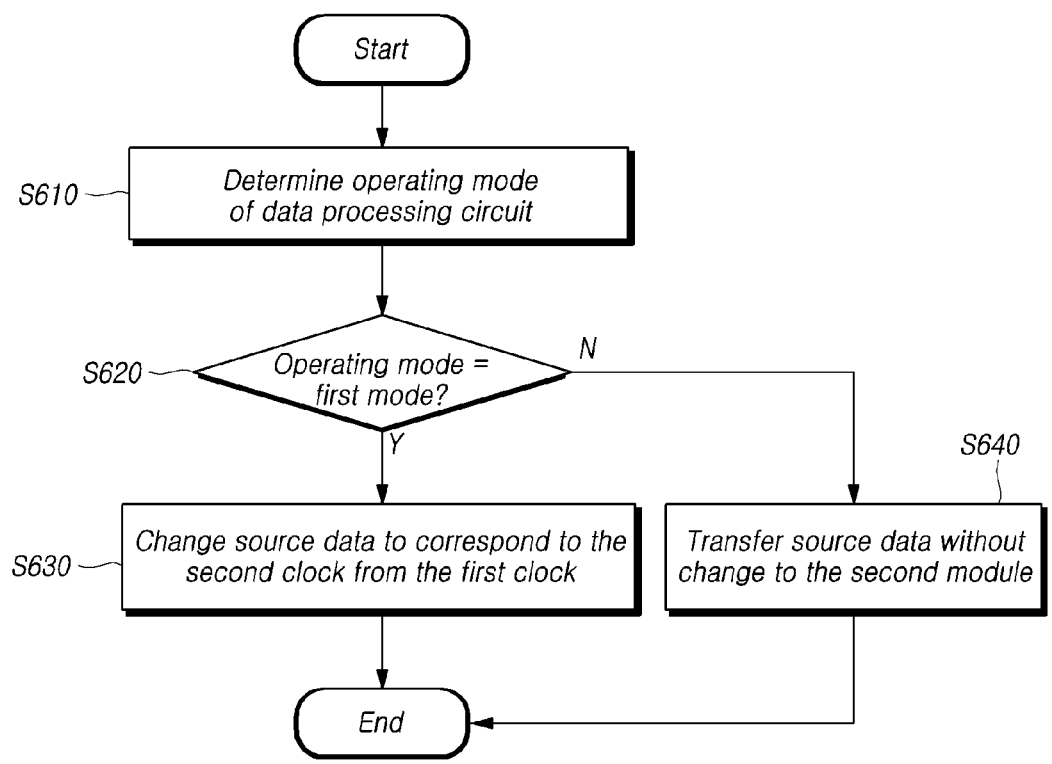
FIG. 6 is a flowchart illustrating exemplary operations of a data processing circuit described with reference to FIG. 5.

FIG. 6 is a flowchart illustrating exemplary operations of the data processing circuit DATA_PROC_CIR described with reference to FIG. 5.

It is assumed that the data processing circuit DATA_PROC_CIR processes the source data SRC_DATA, which is provided from the first module MODULE_1, to provide the result data RES_DATA to the second module MODULE_2. It is assumed that the first module MODULE_1 operates according to the first clock CLK_1 and thus the source data SRC_DATA corresponds to the first clock CLK_1. It is assumed that the second module MODULE_2 operates according to the second clock CLK_2 and thus the result data RES_DATA corresponds to the second clock CLK_2.

Firstly, the data processing circuit DATA_PROC_CIR may determine the operating mode OP_MODE of the data processing circuit DATA_PROC_CIR (S610).

If the operating mode OP_MODE is the first mode MODE_1 (Y in S620), the data processing circuit DATA_PROC_CIR may change the source data SRC_DATA, which originally corresponds to the first clock CLK_1, to correspond to the second clock CLK_2 (S630).

As used herein, changing the source data SRC_DATA to correspond to the second clock CLK_2 from the first clock CLK_1 means that, although information indicated by the source data SRC_DATA is not changed, the waveform of the signal indicating the source data SRC_DATA is changed such that the second module MODULE_2 of the system 10 can process the result data RES_DATA or the changed source data SRC_DATA in synchronization with the second clock CLK_2.

On the other hand, if the operating mode OP_MODE is not the first mode MODE_1, that is, if the operating mode OP_MODE is the second mode MODE_2 (N in S620), the data processing circuit DATA_PROC_CIR may transfer the source data SRC_DATA without change (i.e. bypass the source data SRC_DATA) to the second module MODULE_2 (S640).

As used herein, transferring the source data SRC_DATA without change means that the source data SRC_DATA is output as is without changing the source data SRC_DATA to correspond to the second clock CLK_2. That is, the waveform of the signal indicating the source data SRC_DATA is not changed.

Figure 7:
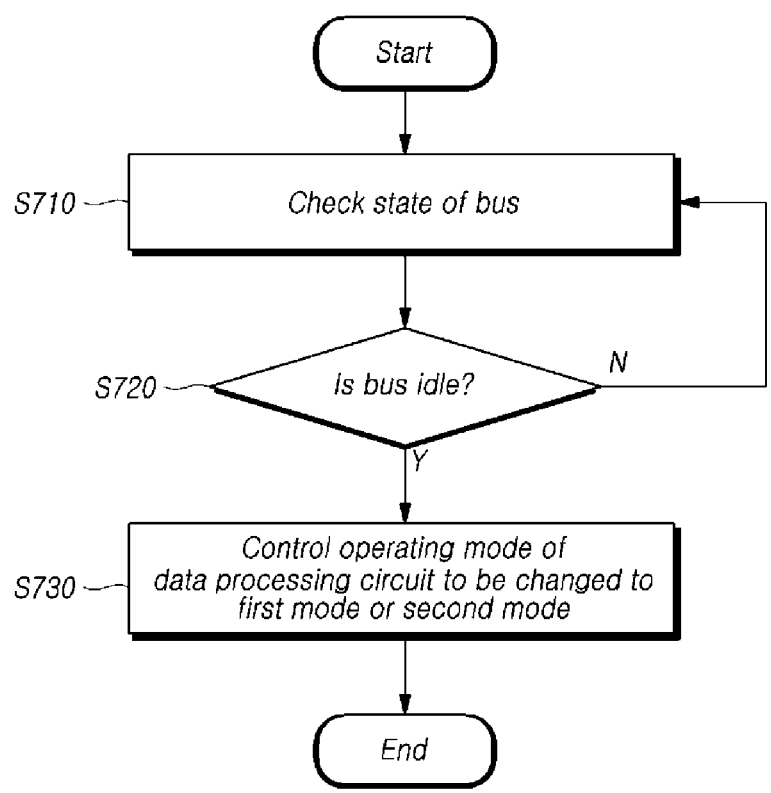
FIG. 7 is a flowchart illustrating exemplary operations of a controller described with reference to FIG. 5.

FIG. 7 is a flowchart illustrating exemplary operations of the controller CTRL described with reference to FIG. 5.

The controller CTRL checks the state of the bus (BUS) (S710) and determines whether or not the bus is idle (S720). As used herein, that the bus is idle means that no data is currently transmitted through the bus.

If the bus is idle (Y in S720), the controller CTRL changes the operating mode OP_MODE of the data processing circuit DATA_PROC_CIR from the first mode MODE_1 to the second mode MODE_2 or vice versa (S730).

On the other hand, if the bus is not idle (N in S720), the controller CTRL returns to step S710 again and checks the state of the bus.

The reason that the controller CTRL changes the operating mode OP_MODE of the data processing circuit DATA_PROC_CIR when the controller CTRL is idle is described below.

Changing the operating mode OP_MODE of the data processing circuit DATA_PROC_CIR means that the result data RES_DATA, which is output from the data processing circuit DATA_PROC_CIR, may also change to correspond a different clock from the original clock (e.g., the second clock CLK_2 having a different frequency from the first clock CLK_1).

If the controller CTRL changes the operating mode OP_MODE of the data processing circuit DATA_PROC_CIR when the bus is not idle, that is, while transmitting source data SRC-DATA from the first module MODULE_1 to the second module MODULE_2 through the bus, the following problem may occur.

Specifically, there may be difference in the clocks, to which the result data RES_DATA correspond, before and after changing the operating mode OP_MODE of the data processing circuit DATA_PROC_CIR. If the second module MODULE_2 fails to recognize such a clock difference, an error may occur when the second module MODULE_2 processes the result data RES_DATA transmitted after the operating mode OP_MODE is changed.

Accordingly, in order to prevent such a problem, the controller CTRL changes the operating mode OP_MODE of the data processing circuit DATA_PROC_CIR while the bus is idle.

Figure 8:
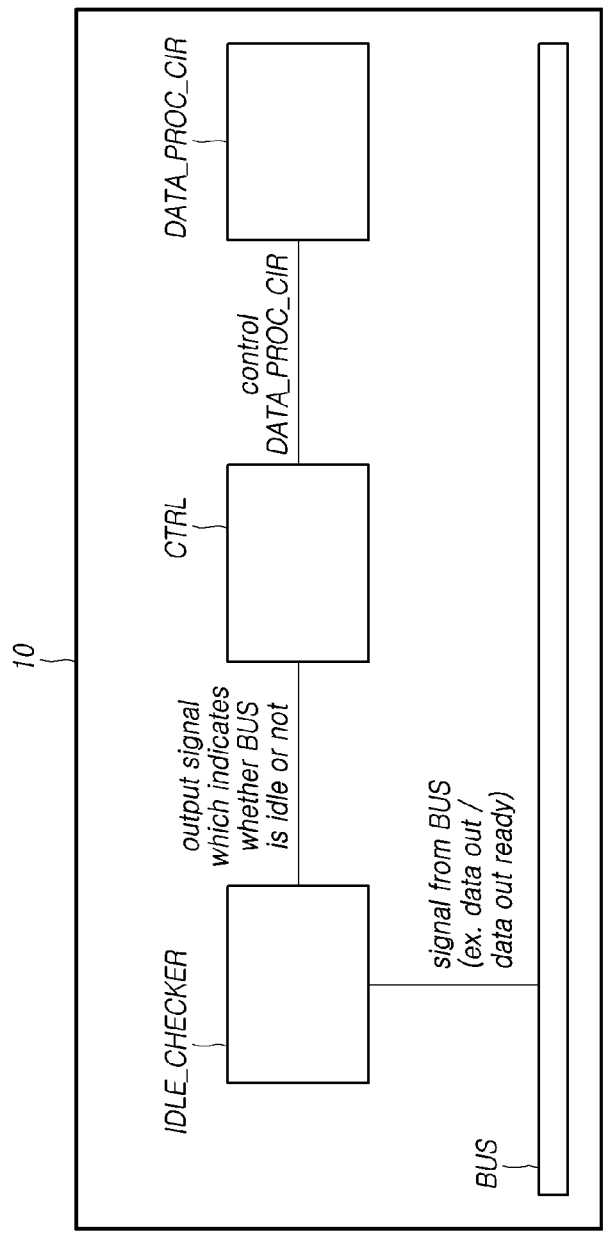
FIG. 8 is a diagram illustrating exemplary operations of checking an idle state in a system according to an embodiment of the present disclosure.

FIG. 8 is a diagram illustrating exemplary operations of checking an idle state in a system 10 according to an embodiment of the present disclosure.

The system 10 may include a checker IDLE_CHECKER configured to output a signal indicating whether or not the bus is idle on the basis of a signal indicating the state of the bus, which is provided from the bus.

For example, the signal indicating the state of the bus may indicate whether or not each module included in the system 10 is currently outputting data.

As another example, the signal indicating the state of the bus BUS may indicate whether or not each module included in the system 10 is currently ready to output data.

The checker IDLE_CHECKER may output information indicating that the bus is idle, if every module in the system 10 is not currently outputting any data and is not ready to output data.

The controller CTRL determines whether the bus is idle according to the signal output from the checker IDLE_CH- ECKER and, if the bus is idle, changes the operating mode OP_MODE of the data processing circuit DATA_PROC_CIR to the first mode MODE_1 or to the second mode MODE_2.

The reason the controller CTRL checks the idle state by using the checker IDLE_CHECKER, as described with reference to FIG. 8, is as follows.

In order for the system 10 to ensure, without using the checker IDLE_CHECKER, that the bus is idle, the system 10 needs first to ensure that the CPU, among the modules included in the system 10, is idle and is thus not performing any operation processing. In addition, after it is confirmed that the CPU is idle, the system 10 needs to ensure, with regard to each module in the system 10, that such module is not outputting any data and is not ready to output data. It is only after these checks are completed that the system 10 can ensure that the bus is idle.

If the system 10 sends messages to all modules of the system 10 and receives responses therefrom, it will take the system 10 a relatively long time to ensure that the bus is idle.

Accordingly, if a signal indicating the state of the bus is received to instantly determine whether or not the bus is idle by using a hardware-circuit such as the checker IDLE_CHECKER, the time necessary for the system 10 to confirm that the bus is idle is advantageously reduced.

Therefore, when the clock of one of modules in the system 10 is changed, the time necessary to confirm that the bus is idle, in order for that module to switch to a state in which it is capable of transmitting/receiving data with respect to another module in the system 10, is reduced. Consequently, the module can quickly switch to a data transmit/receive state and thus communicate with another module in the system 10.

Hereinafter, operations of the data processing circuit DATA_PROC_CIR when the operating mode OP_MODE of the data processing circuit DATA_PROC_CIR is changed, and the structure of the data processing circuit DATA_PROC_CIR for supporting the same, are described in detail.

The data processing circuit DATA_PROC_CIR may include a multiplexer MUX.

The multiplexer MUX may output i) a first signal SIG_1 indicating source data SRC_DATA unchanged or ii) a second signal SIG_2 indicating result data RES_DATA obtained by changing the source data SRC_DATA to correspond to the second clock CLK_2 from the first clock CLK_1.

It is determined by a selection signal SEL_SIG input to the multiplexer MUX whether the multiplexer MUX selects whether the first signal SIG_1 or the second signal SIG_2. The selection signal SEL_SIG may be generated by the checker IDLE_CHECKER.

The data processing circuit DATA_PROC_CIR may include a bridge circuit BRIDGE_CIR configured to generate a signal indicating result data RES_DATA obtained by changing the source data SRC_DATA to correspond to the second clock CLK_2 from the first clock CLK_1.

For example, the bridge circuit BRIDGE_CIR may store the source data SRC_DATA in the register inside the bridge circuit BRIDGE_CIR.

Thereafter, the bridge circuit BRIDGE_CIR may generate a signal indicating the result data RES_DATA on the basis of the second clock CLK_2 and the source data SRC_DATA stored in the register.

The reason the data processing circuit DATA_PROC_CIR selects the first signal SIG_1 or the second signal SIG_2 and outputs the selected signal, by using the multiplexer MUX, is as follows.

If the data processing circuit DATA_PROC_CIR always outputs result data RES_DATA obtained by changing the source data SRC_DATA to correspond to the second clock CLK_2 from the first clock CLK_1, the second module MODULE_2, which operates with the second clock CLK_2, can always receive the result data RES_DATA from the data processing circuit DATA_PROC_CIR with no errors.

However, if the first clock CLK_1 and the second clock CLK_2 have the same operation frequency, the source data SRC_DATA and the result data RES_DATA become identical, and the second module MODULE_2 can accordingly receive the source data SRC_DATA directly inputted thereto. In this case, it takes time for the data processing circuit DATA_PROC_CIR to convert the source data SRC_DATA to the result data RES_DATA, thereby degrading the performance regarding data transmission/reception between modules included in the system 10.

On the other hand, if the first clock CLK_1 and the second clock CLK_2 have different operating frequencies, and if the second module MODULE_2 directly receives the source data SRC_DATA, an error may occur when the second module MODULE_2 receives the source data SRC_DATA.

Therefore, in order to optimize the performance of data transmission/reception between modules included in the system, one signal needs to be appropriately selected from i) a first signal SIG_1 indicating the source data SRC_DATA without change and ii) a second signal SIG_2 indicating result data RES_DATA obtained by changing the source data SRC_DATA to correspond to the second clock CLK_2 from the first clock CLK_1. To this end, the data processing circuit DATA_PROC_CIR may use the multiplexer MUX.

Hereinafter, operations of the data processing circuit DATA_PROC_CIR according to different operating modes are distinguished and described with reference to FIG. 9 and FIG. 10.

Figure 9:
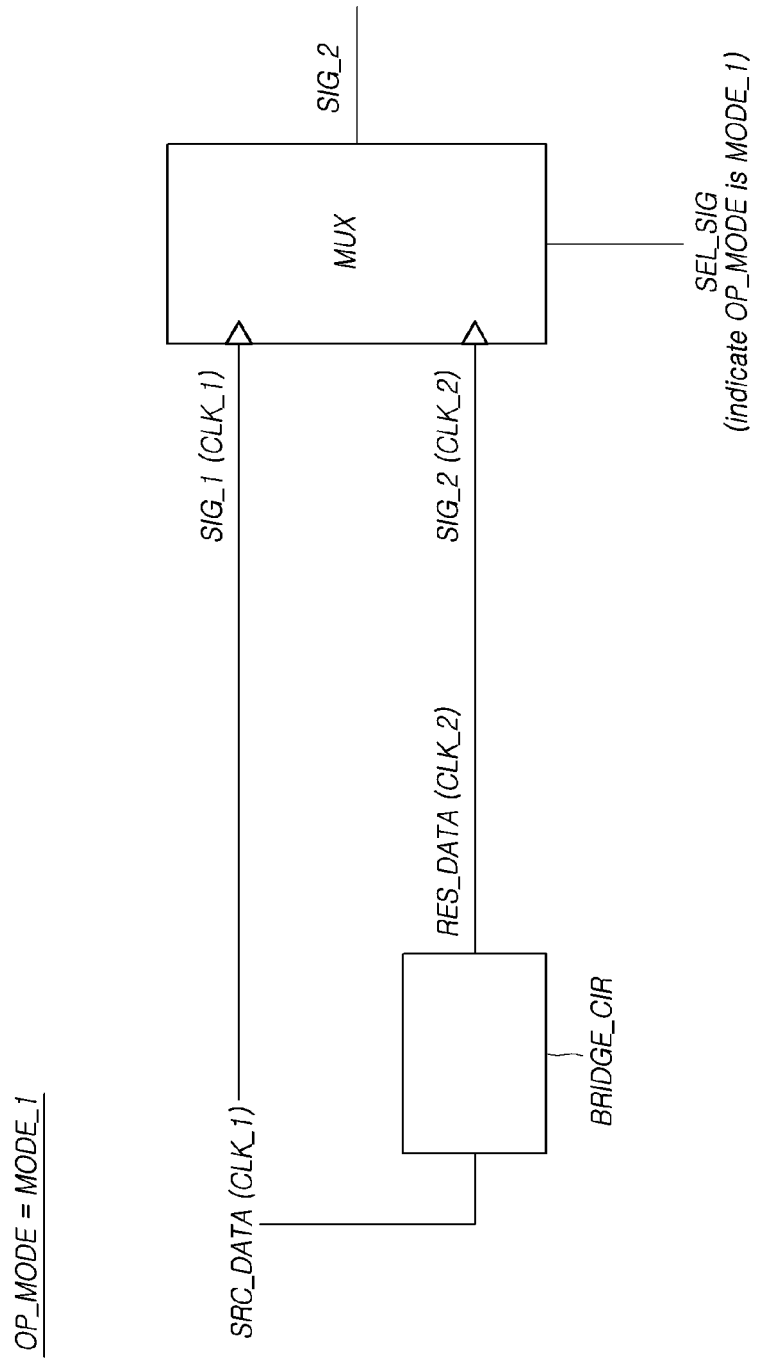
FIG. 9 is a diagram illustrating an exemplary operation of a data processing circuit according to an operating mode in a system according to an embodiment of the present disclosure.

FIG. 9 is a diagram illustrating an exemplary operation of the data processing circuit DATA_PROC_CIR according to the operating mode OP_MODE in the system 10 according to an embodiment of the present disclosure.

FIG. 9 illustrates a case in which the operating mode OP_MODE of the data processing circuit DATA_PROC_CIR is the first mode MODE_1.

Referring to FIG. 9, when the operating mode OP_MODE of the data processing circuit DATA_PROC_CIR is the first mode MODE_1, the multiplexer MUX selects the second signal SIG_2 and then outputs the second signal SIG_2. To this end, a selection signal SEL_SIG indicating that the operating mode OP_MODE is the first mode MODE_1 is input to the multiplexer MUX.

Figure 10:
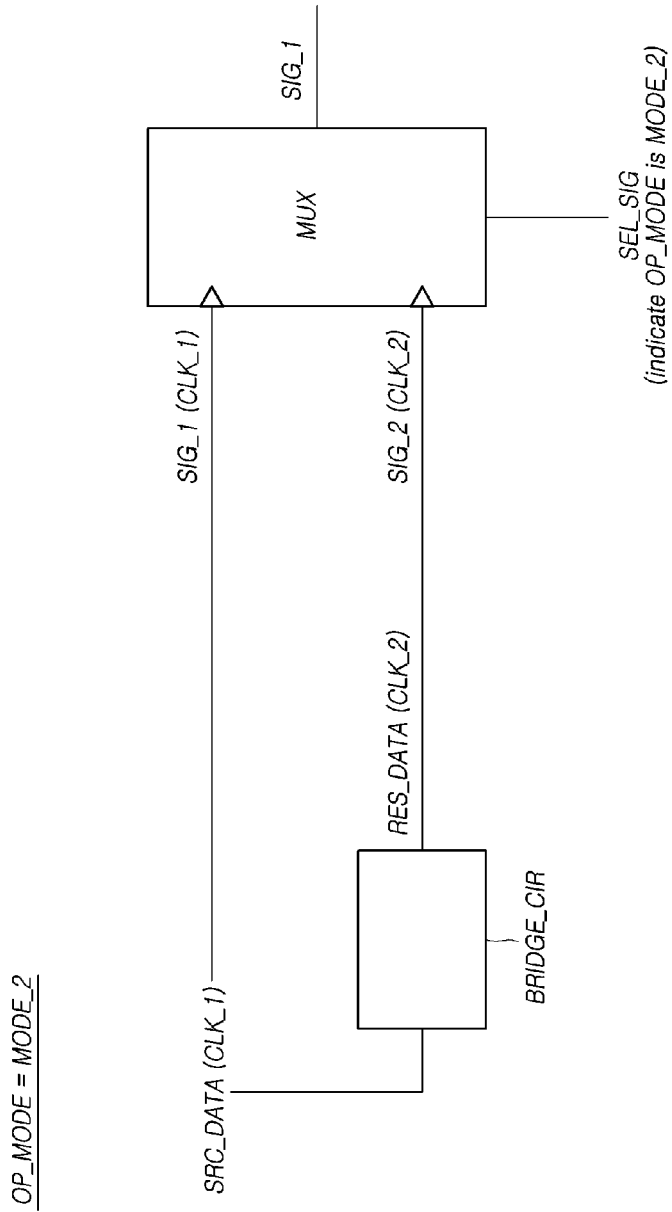
FIG. 10 is a diagram illustrating another exemplary operation of a data processing circuit according to an operating mode in a system according to an embodiment of the present disclosure.

FIG. 10 is a diagram illustrating another exemplary operation of the data processing circuit DATA_PROC_CIR according to the operating mode OP_MODE in the system 10 according to an embodiment of the present disclosure.

FIG. 10 illustrates a case in which the operating mode OP_MODE of the data processing circuit DATA_PROC_CIR is the second mode MODE_2.

Referring to FIG. 10, when the operating mode OP_MODE of the data processing circuit DATA_PROC_CIR is the second mode MODE_2, the multiplexer MUX selects the first signal SIG_1 and then outputs the first signal SIG_1. To this end, a selection signal SEL_SIG indicating that the operating mode OP_MODE is the second mode MODE_2 is input to the multiplexer MUX.

As such, the data processing circuit DATA_PROC_CIR outputs a different signal for each operating mode OP_MODE. Hereinafter, operations of the controller CTRL controlling such a change in the operating mode OP_MODE are described.

Figure 11:
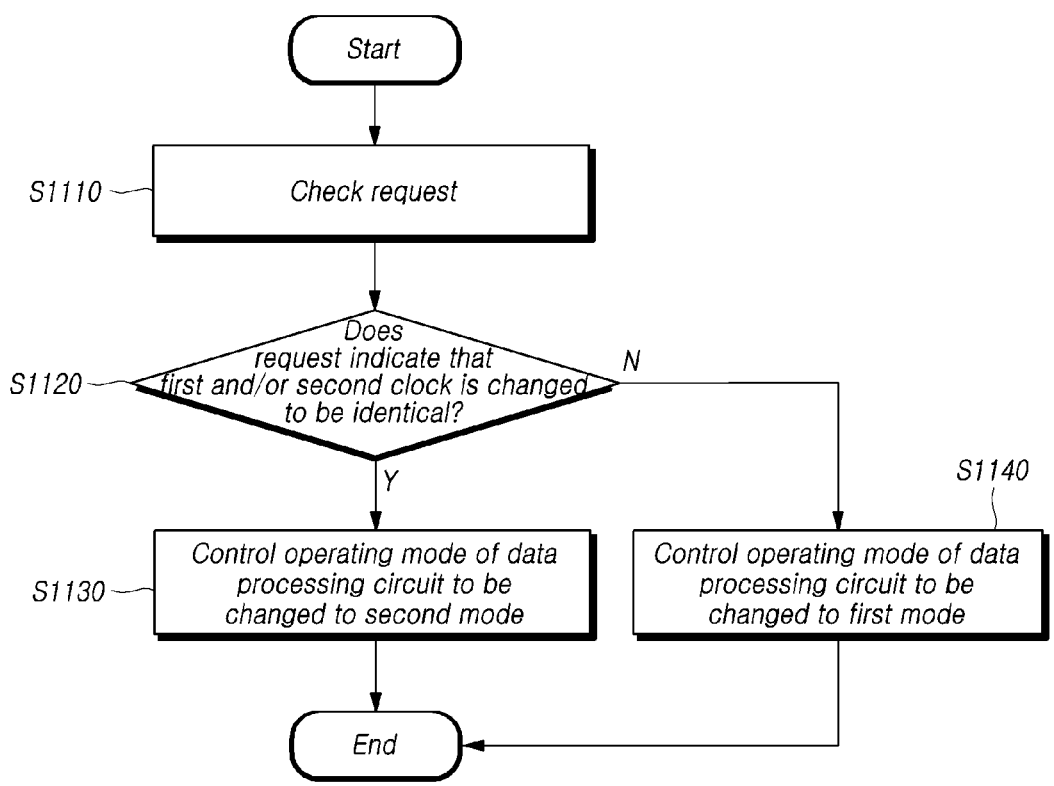
FIG. 11 is a flowchart illustrating exemplary operations of a controller controlling the operating mode of a data processing circuit in a system according to an embodiment of the present disclosure.

FIG. 11 is a flowchart illustrating exemplary operations of a controller CTRL controlling the operating mode OP_MODE of a data processing circuit DATA_PROC_CIR in a system 10 according to an embodiment of the present disclosure.

Firstly, the controller CTRL may check a request indicating whether or not the first clock CLK_1 or the second clock CLK_2 is to be changed (S1110). For example, the request may be a message in a configured format, or a specific signal pattern (for example, low to high or high to low).

The request may be generated by one of modules inside the system 10 (for example, the processor 124).

After step S1110, the controller CTRL determines whether or not the request indicates that the first clock CLK_1 and/or the second clock CLK_2 is/are to be changed to be identical (S1120).

If the request indicates that the first clock CLK_1 and/or the second clock CLK_2 is/are to be changed to be identical (Y in S1120), the controller CTRL may change the operating mode OP_MODE of the data processing circuit DATA_PROC_CIR to the second mode MODE_2 (S1130).

On the other hand, if the request indicates that the first clock CLK_1 and the second clock CLK_2 are to remain at, or at least one of the clocks is to be changed such that the clocks operate at, different operating frequencies (N in S1120), the controller CTRL may change the operating mode OP_MODE of the data processing circuit DATA_PROC_CIR to the first mode MODE_1 (S1140).

Hereinafter, an exemplary state change inside the system 10 over time, when the controller CTRL changes the operating mode OP_MODE of the data processing circuit DATA_PROC_CIR to the second mode MODE_2 in step S1130, is described with reference to FIG. 12 and FIG. 13.

Figure 12:
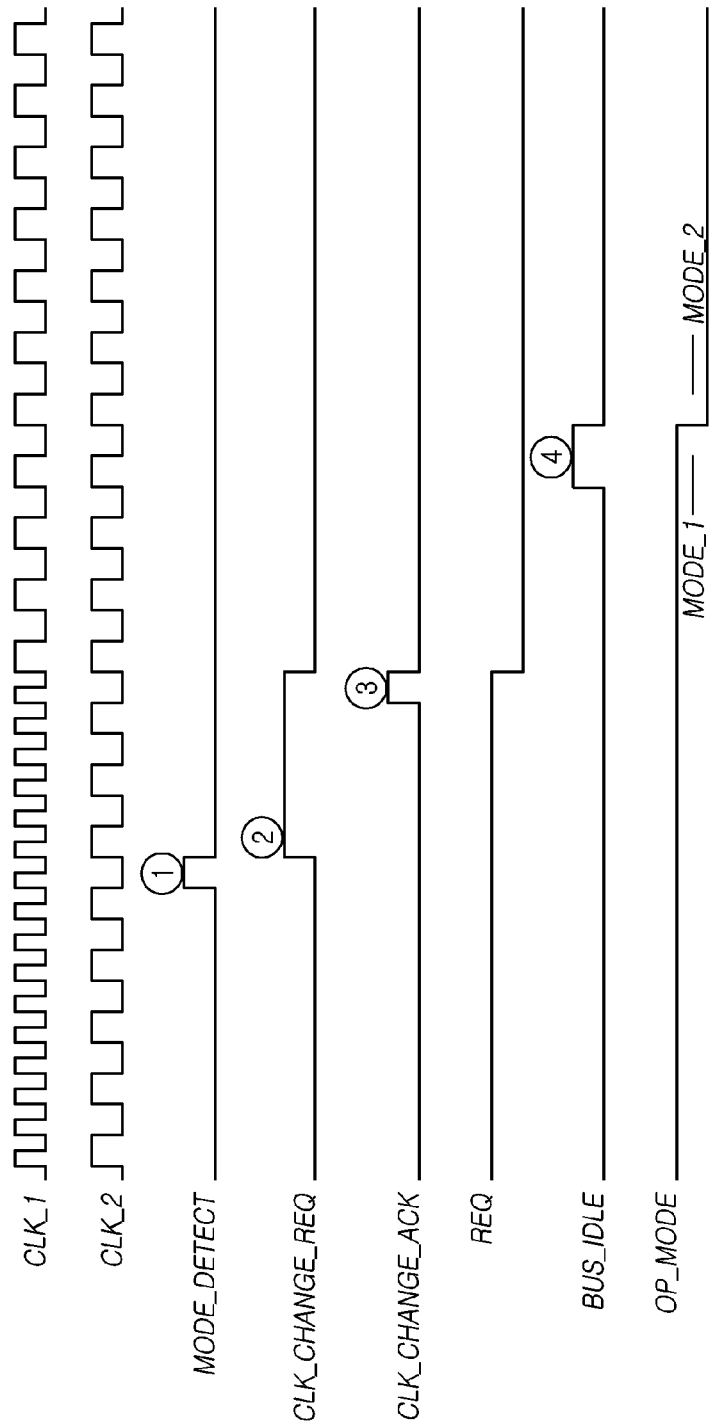
FIG. 12 is a diagram illustrating an exemplary change in the state of a system over time according to an embodiment of the present disclosure.

FIG. 12 is a diagram illustrating an exemplary change in state of the system 10 over time according to an embodiment of the present disclosure.

Referring to FIG. 12, the controller CTRL of the system 10 may sense a change in a mode detection signal MODE_DETECT instructing the controller CTRL to detect the operating mode OP_MODE of the data processing circuit DATA_PROC_CIR (①). After the mode detection signal MODE_DETECT changes from "low" to "high", the controller CTRL may change the operating mode of the data processing circuit DATA_PROC_CIR from the first mode MODE_1 to the second mode MODE_2.

After sensing a change in the mode detection signal MODE_DETECT, the controller CTRL may sense generation of a clock change request signal CLK_CHANGE_REQ (②). In FIG. 12, a clock change request signal CLK_CHANGE_REQ indicating that one of the first clock CLK_1 and the second clock CLK_2 are to be changed to be identical has been generated.

The clock change request signal CLK_CHANGE_REQ may be generated by one of modules in the system 10 (for example, the processor 124).

With regard to the clock change request signal CLK_CHANGE_REQ, the controller CTRL may sense generation of a clock change acknowledgement signal CLK_CHANGE_ACK indicating that the clock change is completed ((③). The clock change acknowledgement signal CLK_CHANGE_ACK may be generated by a module (for example, a clock generation circuit) configured to generate the first clock CLK_1 and the second clock CLK_2 inside the system 10.

The controller CTRL may confirm, after the clock change acknowledgement signal CLK_CHANGE_ACK is generated, that one or both of the first clock CLK_1 and the second clock CLK_2 have been changed to be identical.

In FIG. 12, after the clock change acknowledgement signal CLK_CHANGE_ACK is generated, a request signal REQ is changed, which indicates that the first clock CLK_1 and/or the second clock CLK_2 have been changed to be identical. In FIG. 12, the request signal REQ changes from "high" to "low" to indicate such result.

After sensing a change in the request signal REQ described above, the controller CTRL may detect a bus idle signal BUS_IDLE, which indicates whether the bus included in the system 10 is idle ((④)). In FIG. 12, a "high" bus idle signal BUS_IDLE means that the bus is idle.

After detecting the bus idle signal BUS_IDLE, the controller CTRL may control the data processing circuit DATA_PROC_CIR to change the operating mode OP_MODE from the first mode MODE_1 to the second mode MODE_2. That is, after one or both of the first clock CLK_1 and the second clock CLK_2 have been changed to be identical, the controller CTRL may control the data processing circuit DATA_PROC_CIR to change the operating mode OP_MODE to the second mode MODE_2.

This is for the purpose of preventing erroneous selection of the clock corresponding to data output through the data processing circuit DATA_PROC_CIR, if the first clock CLK_1 and the second clock CLK_2 have different operating frequencies at the time at which the operating mode OP_MODE of the data processing circuit DATA_PROC_CIR is changed. That is, this is for the purpose of ensuring that the first clock CLK_1 and the second clock CLK_2 have identical operating frequencies at the time at which the operating mode OP_MODE of the data processing circuit DATA_PROC_CIR is changed to the second mode MODE_2, thereby ensuring that, no matter which clock is selected by the second module MODULE_2, data output through the data processing circuit DATA_PROC_CIR can be received with no errors.

Figure 13:
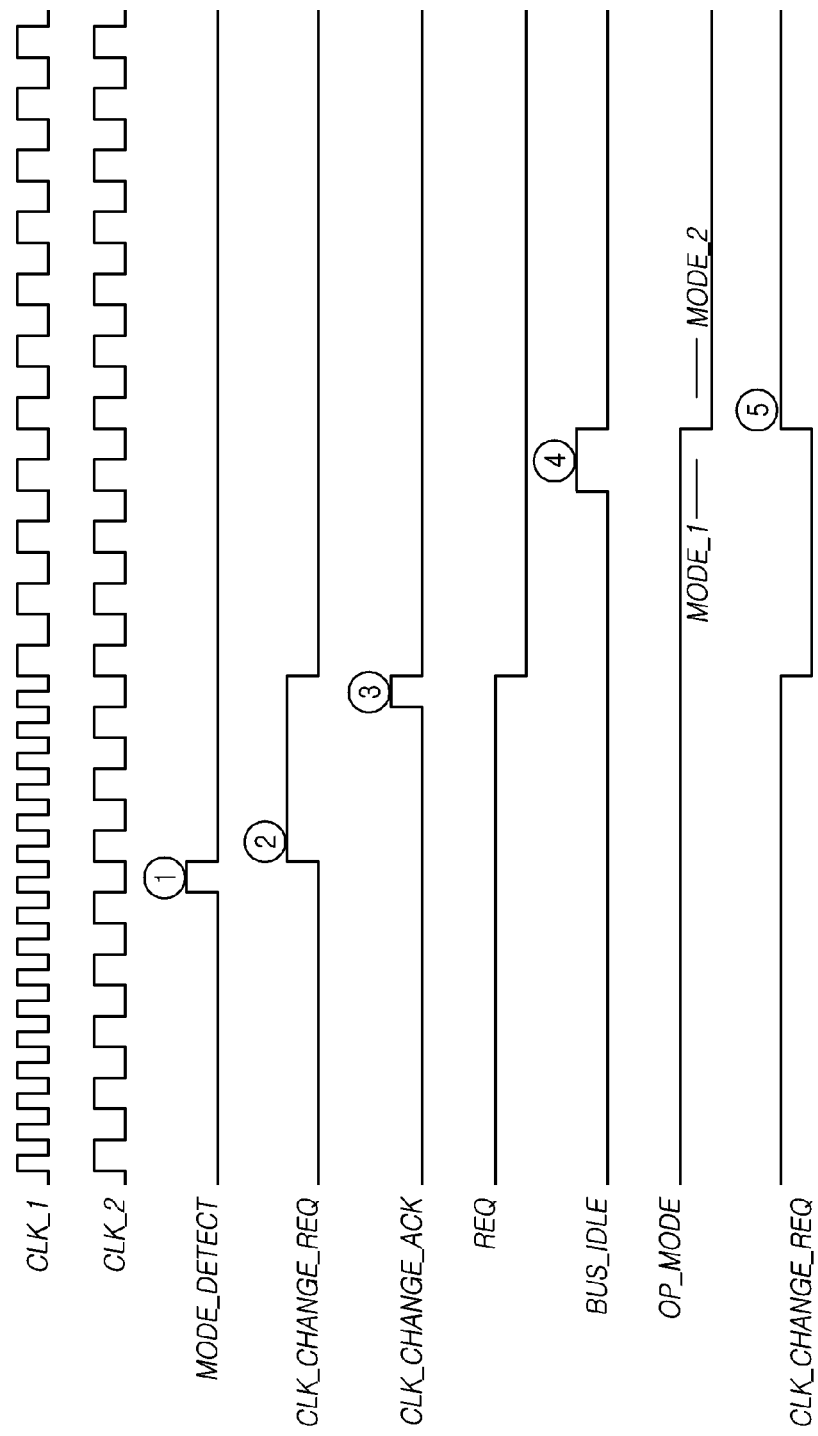
FIG. 13 is a diagram illustrating a time at which an acknowledgement signal regarding a request is transmitted in FIG. 12.

FIG. 13 is a diagram illustrating a time at which an acknowledgement signal regarding a request is transmitted in FIG. 12.

Referring to FIG. 13, when the operating mode OP_MODE of the data processing circuit DATA_PROC_CIR is changed to the second mode MODE_2 by the controller CTRL, the controller CTRL may generate an acknowledge signal REQ_ACK regarding the above-mentioned request signal REQ ((⑤)). The controller CTRL may change the operating mode OP_MODE of the data processing circuit DATA_PROC_CIR from the first mode MODE_1 to the second mode MODE_2 at the time at which the acknowledge signal REQ_ACK regarding the request signal REQ is transmitted.

Hereinafter, an exemplary state change of the system 10 over time, when the controller CTRL changes the operating mode OP_MODE of the data processing circuit DATA_PROC_CIR to the first mode MODE_1 in step S1140, is described with reference to FIG. 14 and FIG. 15.

Figure 14:
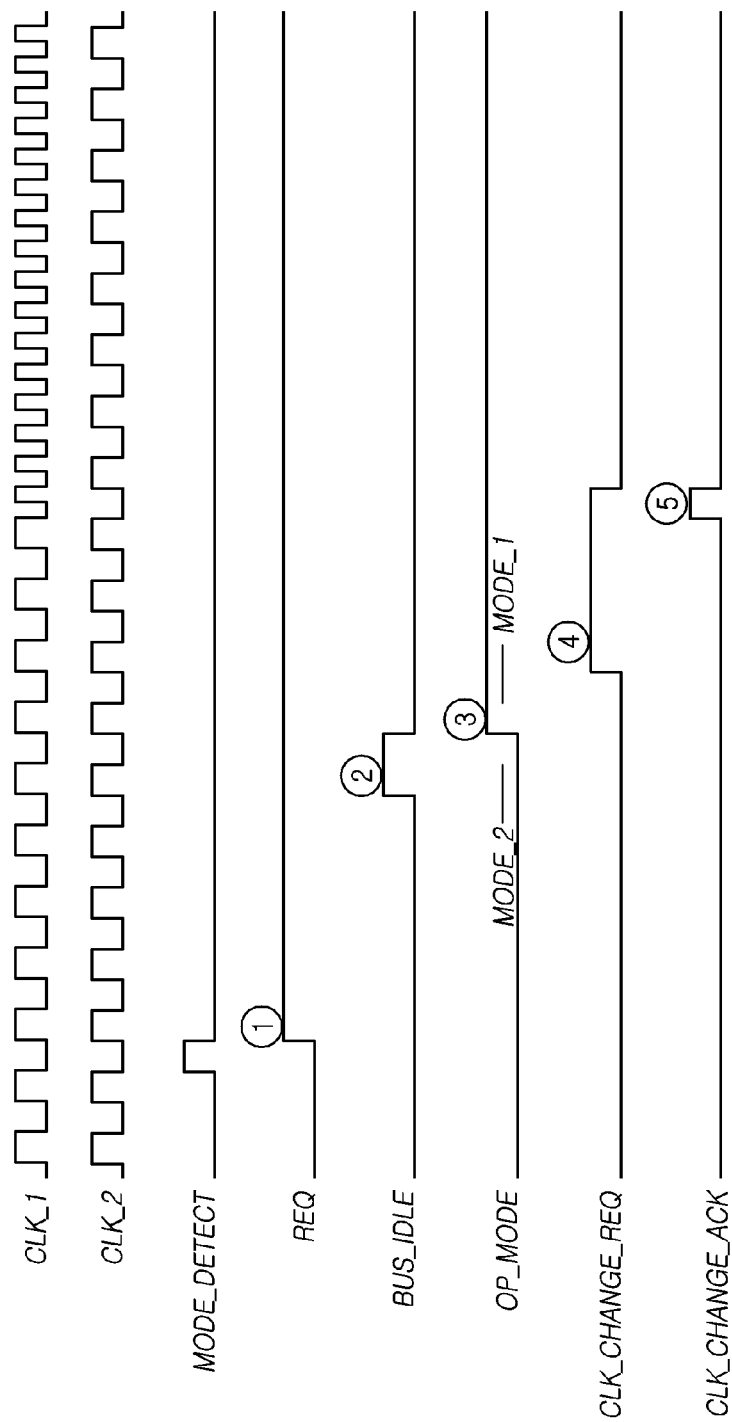
FIG. 14 is a diagram illustrating another exemplary change in the state of a system over time according to an embodiment of the present disclosure.

FIG. 14 is a diagram illustrating another exemplary change in the state of the system 10 over time according to an embodiment of the present disclosure.

Referring to FIG. 14, the controller CTRL of the system 10 may sense a change in the mode detection signal MODE_DETECT instructing the controller CTRL to detect the operating mode OP_MODE of the data processing circuit DATA_PROC_CIR. After the mode detection signal MODE_DETECT changes from "low" to "high", the controller CTRL may change the operating mode OP_MODE of the data processing circuit DATA_PROC_CIR from the second mode MODE_2 to the first mode MODE_1.

In FIG. 14, after the mode detection signal MODE_DETECT is changed, a request signal REQ is generated (①). The request signal REQ acts as an instruction to change one or both of the first clock CLK_1 and the second clock CLK_2 so that they are different. In FIG. 12, the instruction is asserted when the request signal REQ changes from "low" to "high". In FIG. 14, the first clock CLK_1 is changed to have greater frequency than the second clock CLK_2 in response to the request signal.

Upon sensing generation of the request signal REQ described above, the controller CTRL may detect a bus idle signal BUS_IDLE, which indicates whether the bus included in the system 10 is idle (②). In FIG. 14, a "high" bus idle signal BUS_IDLE means that the bus is idle.

After detecting the bus idle signal BUS_IDLE, the controller CTRL may control the data processing circuit DATA_PROC_CIR to change its operating mode OP_MODE from the second mode MODE_2 to the first mode MODE_1.

After the operating mode OP_MODE is changed to the first mode MODE_1, the controller CTRL may sense generation of a clock change request signal CLK_CHANGE_REQ (④). In FIG. 14, a clock change request signal CLK_CHANGE_REQ indicating that one or both of the first clock CLK_1 and the second clock CLK_2 is/are to be changed to be different has been generated.

The clock change request signal CLK_CHANGE_REQ may be generated by one of modules included in the system 10 (for example, the processor 124).

With regard to the clock change request signal CLK_CHANGE_REQ, the controller CTRL may sense generation of a clock change acknowledgement signal CLK_CHANGE_ACK indicating that the clock change is completed (⑤). The clock change acknowledgement signal CLK_CHANGE_ACK may be generated by a module (for example, a clock generation circuit) configured to generate the first clock CLK_1 and the second clock CLK_2 inside the system 10.

The controller CTRL may control the data processing circuit DATA_PROC_CIR to change the operating mode OP_MODE to the first mode MODE_1 before the first clock CLK_1 and the second clock CLK_2 are different.

This is for the purpose of ensuring that the first clock CLK_1 and the second clock CLK_2 have identical operating frequencies at the time at which the operating mode OP_MODE of the data processing circuit DATA_PROC_CIR is changed, as described with reference to FIG. 12, thereby ensuring that, no matter which clock is selected by the second module MODULE_2, data output through the data processing circuit DATA_PROC_CIR can be received with no errors.

Figure 15:
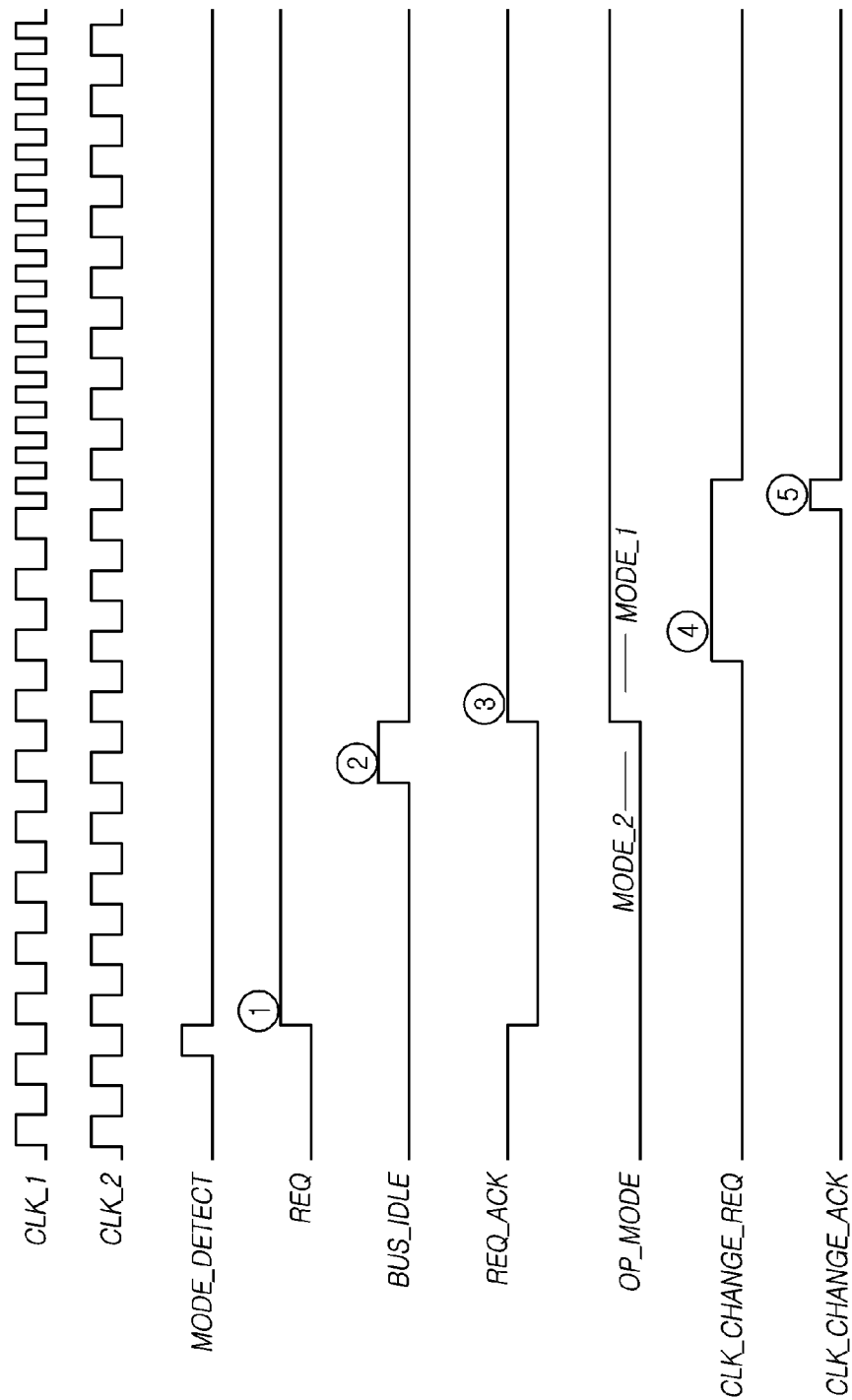
FIG. 15 is a diagram illustrating a time at which an acknowledgement signal regarding a request is transmitted in FIG. 14.

FIG. 15 is a diagram illustrating a time at which an acknowledgement signal regarding a request is transmitted in FIG. 14.

Referring to FIG. 15, when the operating mode OP_MODE of the data processing circuit DATA_PROC_CIR is changed to the first mode MODE_1 by the controller CTRL, the controller CTRL may generate an acknowledge signal REQ_ACK regarding the above-mentioned request signal REQ (③). The controller CTRL may change the operating mode OP_MODE of the data processing circuit DATA_PROC_CIR from the second mode MODE_2 to the first mode MODE_1 at the time at which the acknowledgement signal REQ_ACK regarding the request signal REQ is transmitted.

Figure 16:
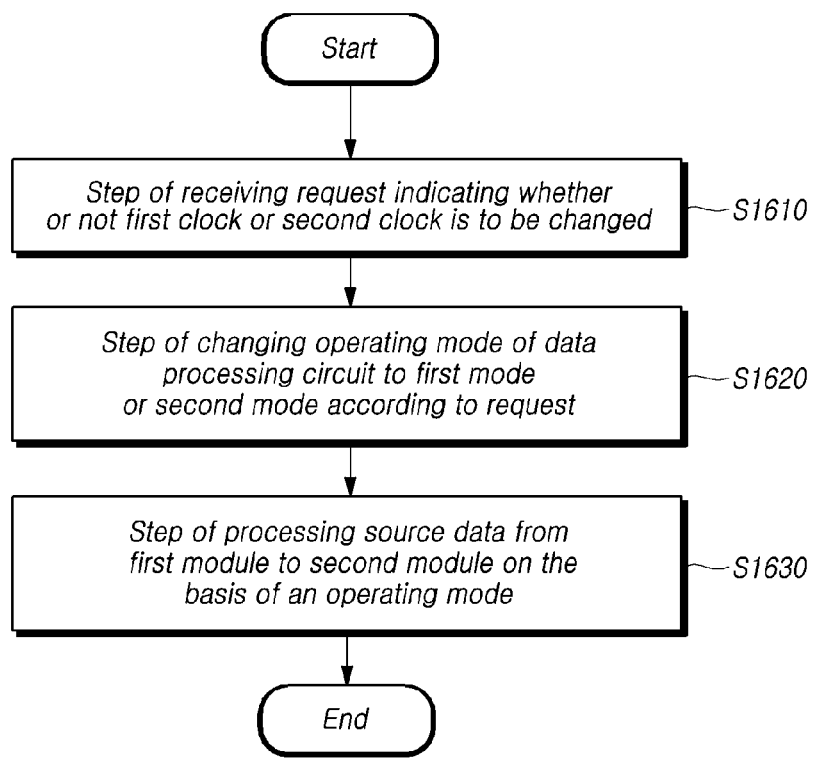
FIG. 16 is a diagram illustrating a method for operating a system according to an embodiment of the present disclosure.

FIG. 16 is a diagram illustrating a method for operating a system 10 according to an embodiment of the present disclosure.

The method for operating the system 10 may include receiving, from a module such as the processor 124, a request indicating whether or not the first clock CLK_1 or the second clock CLK_2 is to be changed (S1610). The request may indicate that one of the first clock CLK_1 and the second clock CLK_2 are to be changed to be identical, or may indicate that one of the first clock CLK_1 and the second clock CLK_2 are to be changed to be different.

The method for operating the system 10 may include a step of changing the operating mode OP_MODE of the data processing circuit DATA to the first mode MODE_1 or to the second mode MODE_2 according to the request received in step S1610 (S1620).

The method for operating the system 10 may include a step of processing source data transmitted from the first module MODULE_1 to provide to the second module MODULE_2 on the basis of an operating mode in step S1630 (S1630).

The data processing circuit DATA_PROC_CIR may process the source data SRC_DATA transmitted from the first module MODULE_1 operating according to the first clock CLK_1 to the second module MODULE_2 operating according to the second clock CLK_2.

If the operating mode OP_MODE is the first mode MODE_1, the data processing circuit DATA_PROC_CIR may change the source data SRC_DATA to correspond to the second clock CLK_2 from the first clock CLK_1.

On the other hand, if the operating mode OP_MODE is the second mode MODE_2, the data processing circuit DATA_PROC_CIR may transfer the source data SRC_DATA without change to the second module MODULE_2.

Figure 17:
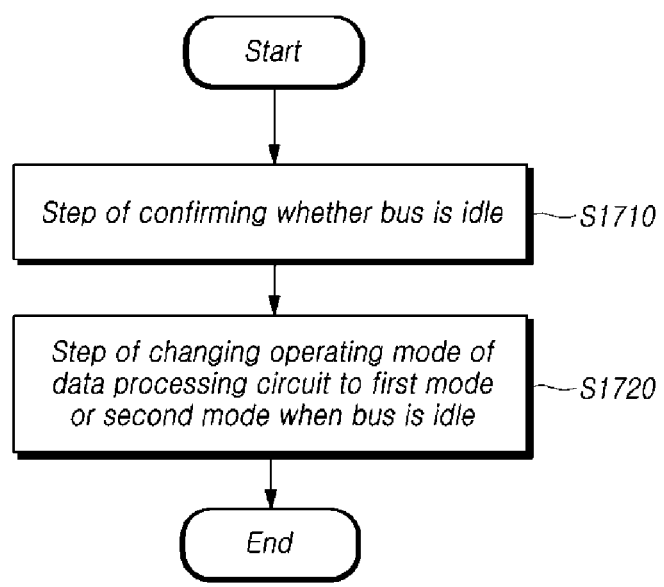
FIG. 17 is a diagram illustrating a method for changing the operating mode of a data processing circuit according to an embodiment of the present disclosure.

FIG. 17 is a diagram illustrating a method for changing the operating mode OP_MODE of the data processing circuit DATA_PROC_CIR according to an embodiment of the present disclosure.

The method for changing the operating mode OP_MODE of the data processing circuit DATA_PROC_CIR may include confirming whether or not the bus connected to the first module MODULE_1 and the second module MODULE_2 is idle (S1710).

The method for changing the operating mode OP_MODE of the data processing circuit DATA_PROC_CIR may include changing the operating mode OP_MODE of the data processing circuit DATA_PROC_CIR to the first mode MODE_1 or to the second mode MODE_2 when the bus BUS is idle (S1720).

The data processing circuit DATA_PROC_CIR may output i) a first signal SIG_1 indicating the source data SRC_DATA without change or ii) a second signal SIG_2 indicating result data RES_DATA obtained by changing the source data SRC_DATA to correspond to the second clock CLK_2 from the first clock CLK_1.

When it is determined that the request indicates that one of the first clock CLK_1 and the second clock CLK_2 are to be changed to be different, the controller CTRL may change the operating mode OP_MODE of the data processing circuit DATA_PROC_CIR to the first mode MODE_1. The operating mode OP_MODE of the data processing circuit DATA_PROC_CIR may be changed to the first mode MODE_1 before the first clock CLK_1 and/or the second clock CLK_2 are changed to be different.

When it is determined that the request indicates that one or both of the first clock CLK_1 and the second clock CLK_2 are to be changed to be identical, the controller CTRL may change the operating mode OP_MODE of the data processing circuit DATA_PROC_CIR to the second mode MODE_2. The operating mode OP_MODE of the data processing circuit DATA_PROC_CIR may be changed to the second mode MODE_2 after the first clock CLK_1 and the second clock CLK_2 are changed to be identical.

When the controller CTRL controls the data processing circuit DATA_PROC_CIR to change its operating mode OP_MODE according to the request, the controller CTRL may change the operating mode OP_MODE of the data processing circuit DATA_PROC_CIR to the first mode MODE_1 or to the second mode MODE_2 at the time at which an acknowledgement signal regarding the request is transmitted.

Figure 18:
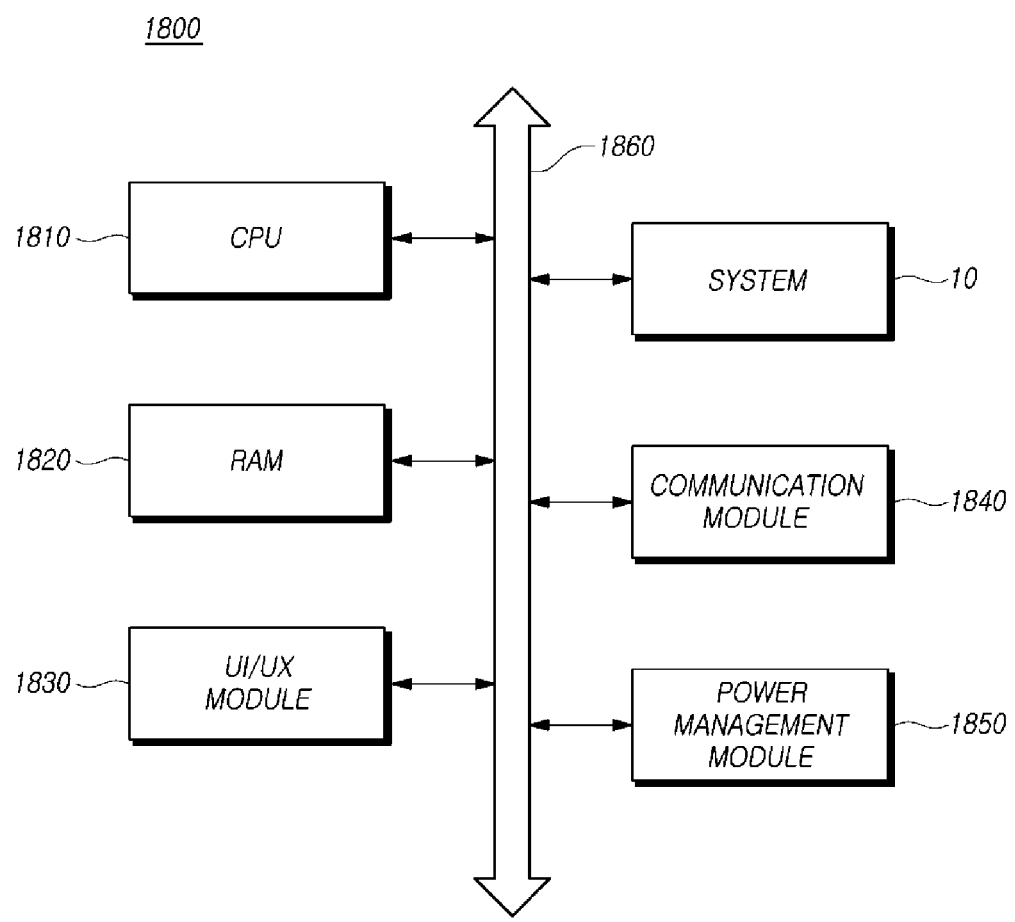
FIG. 18 is a diagram illustrating the configuration of a computing system according to an embodiment of the present disclosure.

FIG. 18 is a diagram illustrating the configuration of a computing system 1800 according to an embodiment of the present disclosure.

Referring to FIG. 18, the computing system 1800 may include: a system 10 electrically connected to a computing system 1800; a CPU 1810 configured to control overall operations of the computing system 1800; a RAM 1820 configured to store data and information related to operations of the computing system 1800; a user interface/user experience (UI/UX) module 1830 configured to provide the user with a user environment; a communication module 1840 configured to communicate with an external device in a wired/and/or wireless manner; a power management module 1850 configured to manage power used by the computing system 1800; and the like.

The computing system 1800 may be a personal computer (PC), a mobile terminal (for example, a smartphone or a tablet) or any of various other kinds of electronic devices.

The computing system 1800 may further include a battery for supplying a dynamic voltage, an application chipset, a graphic-related module, a camera image processor (CIS), and a DRAM. It is obvious to a person skilled in the art that the computing system 1800 may further include other components.

The system 10 may be the memory system 100 described with reference to FIG. 1 to FIG. 4, for example.

The memory system 100 may be a device configured to store data in a magnetic disk, such as a hard disk drive (HDD), or a device configured to store data in a nonvolatile memory, such as a solid state drive (SSD), a universal flash storage (UFS) device, and an embedded MMC (eMMC) device. The nonvolatile memory may include a read only memory (ROM), a programmable ROM (PROM), an electrically programmable ROM (EPROM), an electrically erasable and programmable ROM (EEPROM), a flash memory, a phase-change RAM (PRAM), a magnetic RAM (MRAM), a resistive RAM (RRAM), and/or a ferroelectric RAM (FRAM). Furthermore, the memory system 100 may be implemented as any of various types of storage devices and mounted inside any of various electronic devices.

Although embodiments of the present invention have been illustrated and described, those skilled in the art will appreciate that various modifications and changes may be made without departing from the scope and spirit of the present disclosure. Further, the embodiments disclosed herein are not intended to limit the present invention; rather, they are intended to explain the present invention. The present invention encompasses all modifications and changes that fall within the scope of the claims including their equivalents.

What is claimed is:

1. A system comprising:
a first module circuit configured to transmit source data, wherein a clock of the first module circuit is a first clock and a value of the first clock is changeable;
a second module circuit configured to receive the source data, wherein a clock of the second module circuit is a second clock and a value of the second clock is changeable;
a bus connected to the first module circuit and to the second module circuit;
a data processing circuit configured to process the source data transmitted from the first module circuit and to provide the processed source data via the bus to the second module circuit, on the basis of an operating mode of the data processing circuit; and
a controller configured to change the operating mode of the data processing circuit to a first mode or to a second mode, according to a request indicating whether or not the first clock or the second clock is to be changed,
wherein the data processing circuit is further configured to change a waveform of the source data to correspond to the second clock from the first clock in the case that the value of the second clock is different from the value of the first clock, when the operating mode is the first mode, and to provide the second module circuit with the source data without change in the case that the value of the second clock is same as the value of the first clock, when the operating mode is the second mode,
wherein the controller is configured to change the operating mode of the data processing circuit to the first mode or to the second mode when the bus is idle after the request is received, and
wherein the bus is idle when no data is currently transmitted through the bus.

2. The system of claim 1, wherein the data processing circuit comprises a multiplexer configured to output one of i) a first signal indicating the source data without change and ii) a second signal indicating result data obtained by changing the source data to correspond to the second clock from the first clock.

3. The system of claim 2, wherein the data processing circuit comprises a bridge circuit configured to generate the result data.

4. The system of claim 1, wherein the controller is configured to change the operating mode of the data processing circuit to the second mode when the request indicates that at least one of the first clock and the second clock is to be changed such that the first and second clocks are identical.

5. The system of claim 4, wherein the controller is configured to change the operating mode of the data processing circuit to the second mode after the first clock and the second clock are changed to be identical.

6. The system of claim 1, wherein the controller is configured to change the operating mode of the data processing circuit to the first mode when the request indicates that the first clock and the second clock are to be changed to be different.

7. The system of claim 6, wherein the controller is configured to change the operating mode of the data processing circuit to the first mode before at least one of the first clock and the second clock is changed such that the first and second clocks are different.

8. The system of claim 1, wherein the controller is configured to change the operating mode of the data processing circuit to the first mode or to the second mode when an acknowledgement signal regarding the request is transmitted.

9. A method for operating a system including a first module circuit configured to transmit source data, wherein a clock of the first module circuit is a first clock and a value of the first clock is changeable, and a second module circuit configured to receive the source data, wherein a clock of the second module circuit is a second clock and a value of the second clock is changeable, the method comprising:

receiving a request indicating whether or not the first clock or the second clock is to be changed;

changing an operating mode of a data processing circuit to a first mode or to a second mode according to the request; and processing the source data transmitted from the first module circuit to provide the processed source data via a bus to the second module circuit, on the basis of an operating mode, wherein the processing of the source data includes:

changing a waveform of the source data to correspond to the second clock from the first clock in the case that the value of the second clock is different from the value of the first clock, when the operating mode is the first mode; and providing a second module circuit with the source data without change in the case that the value of the second clock is same as the value of the first clock, when the operating mode is the second mode, wherein the changing of the operating mode comprises:

confirming whether or not the bus connected to the first module circuit and to the second module circuit is idle; and changing the operating mode to the first mode or to the second mode when the bus is idle, and wherein the bus is idle when no data is currently transmitted through the bus.

10. The method of claim 9, wherein the processing of the source data further includes outputting one of i) a first signal indicating the source data without change and ii) a second signal indicating result data obtained by changing the source data to correspond to the second clock from the first clock.

11. The method of claim 9, wherein the changing of the operating mode includes changing the operating mode to the second mode when the request indicates that at least one of the first clock and the second clock is to be changed such that the first and second clocks are identical.

12. The method of claim 11, wherein the operating mode of the data processing circuit is changed to the second mode after the first clock and the second clock are changed to be identical.

13. The method of claim 9, wherein the changing of the operating mode includes changing the operating mode to the first mode when the request indicates that the first clock and the second clock are to be changed to be different.

14. The method of claim 13, wherein the operating mode of the data processing circuit is changed to the first mode before at least one of the first clock and the second clock is changed such that first and second clocks are different.

15. The method of claim 9, wherein the operating mode is changed when an acknowledgement signal regarding the request is transmitted.

* * * * *